US010764163B2

(12) United States Patent
Hull et al.

(10) Patent No.: US 10,764,163 B2
(45) Date of Patent: *Sep. 1, 2020

(54) DETERMINING AN EVENT HISTORY FOR AN EVENT PROCESSED BY A PLURALITY OF COMMUNICATING SERVERS VIA A CENTRAL EVENT DATA LOG

(71) Applicant: GOOGLE LLC, Mountain View, CA (US)

(72) Inventors: David Morris Hull, Louisville, CO (US); Michael Georg Wolfgang Linck, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,495

(22) Filed: Dec. 3, 2018

(65) Prior Publication Data

US 2019/0104038 A1    Apr. 4, 2019

Related U.S. Application Data

(63) Continuation of application No. 14/558,609, filed on Dec. 2, 2014, now Pat. No. 10,148,533.

(51) Int. Cl.
*G06F 13/00* (2006.01)
*H04L 12/26* (2006.01)
(Continued)

(52) U.S. Cl.
CPC .......... *H04L 43/04* (2013.01); *G06F 11/3006* (2013.01); *G06F 11/3476* (2013.01);
(Continued)

(58) Field of Classification Search
CPC ...... G06F 11/30; G06F 11/34; G06F 11/3006; G06F 11/3476; G06F 13/00;
(Continued)

(56) References Cited

U.S. PATENT DOCUMENTS 10,148,533 B1    12/2018 Hull et al.

FOREIGN PATENT DOCUMENTS

EP    2 672 443 A1    12/2013

OTHER PUBLICATIONS

Harrell "U.S. Office Action issued in co-pending U.S. Appl. No. 14/558,609, filed Dec. 2, 2014", dated Jun. 19, 2017, 7 pages.

*Primary Examiner* — Robert B Harrell

(74) *Attorney, Agent, or Firm* — Dority & Manning, PA

(57) ABSTRACT

An originating server of a payment processing system comprising multiple communicating servers first processes a transaction event, generates a correlating identifier and transmits the correlating identifier and processing information to a central data log accessible by the multiple communicating servers. One or more intermediate servers and a terminating server then process the transaction event, each successive intermediate server and the terminating server receiving the transaction event and a correlation identifier associated with the transaction event generated by the previous server which processed the transaction event. Each successive intermediate server and the terminating server generates a correlation identifier, and transmits both the received and generated correlation identifiers to the central transaction log. A query comprising a correlation identifier associated with the transaction event is received. The payment processing system extracts successive sets of entries from the central data log by matching corresponding correlation identifiers and generates a transaction event history.

20 Claims, 8 Drawing Sheets

(51) Int. Cl.
  *G06F 11/30* (2006.01)
  *G06F 11/34* (2006.01)
  *H04L 12/24* (2006.01)
(52) U.S. Cl.
  CPC ........ H04L 41/064 (2013.01); H04L 43/0864 (2013.01); *G06F 2201/87* (2013.01)
(58) Field of Classification Search
  CPC ............. G06F 2201/87; G06F 11/3068; G06F 2201/86; H04L 12/26; H04L 12/2602; H04L 29/06; H04L 29/08072; H04L 41/22; H04L 41/064; H04L 43/00; H04L 43/04; H04L 43/0864; H04L 29/0807
  USPC ........................................................ 709/224
  See application file for complete search history.

DETERMINING AN EVENT HISTORY FOR AN EVENT PROCESSED BY A PLURALITY OF COMMUNICATING SERVERS VIA A CENTRAL EVENT DATA LOG

CROSS REFERENCE TO RELATED APPLICATIONS

This application is a continuation of and claims priority to U.S. patent application Ser. No. 14/558,609, filed Dec. 2, 2014 and entitled "Determining an Event History for an Event Processed by a Plurality of Communicating Servers Via a Central Event Data Log." The entire contents of the above-identified application are hereby fully incorporated herein by reference.

TECHNICAL FIELD

The present disclosure relates generally to improving the process for determining the status of an event processed by a plurality of communicating servers.

BACKGROUND

Processing events are often processed by a system comprising a plurality of communicating servers, each server completing one or more processing steps and transmitting the event to a subsequent server for further processing. Maintaining a central data log that receives data from each of the plurality of servers processing events is a useful method of logging events so that the system can determine the status of an event. One way of logging an event is for each server of the payment processing system to transmit data to the central data log in a standard format comprising a unique identifier for the transaction event. Additionally, each server may transmit the event to a subsequent server for further processing in addition to an event history comprising a server identifier, wherein each subsequent server adds its own server identifier to the event history. This provides a complete event history after each transmission of data between servers.

However, current technology does not provide for maintaining a central data log, wherein each server of a system transmits data to the central data log comprising a received correlation identifier from a server that previously processed an event, a unique correlation identifier generated by the particular server for the event, a current timestamp, and processing details. Additionally, current technology does not provide for generating an event history by extracting successive sets of one or more entries from the central data log associated with the event by matching corresponding correlation identifiers in the extracted entries and ordering the extracted entries chronologically according to time stamps within each entry.

SUMMARY

Techniques herein provide computer-implemented methods to obtain a transaction event history from a central data log accessible by a plurality of communicating servers of a payment processing system. In an example embodiment, a transaction event initiated by a user is processed by multiple communicating servers associated with a payment processing system. In another example embodiment, the transaction event is processed by multiple communicating processors. In this example embodiment, the multiple communicating processors may reside on a single computing device or may reside on more than one computing device. The transaction event is first processed by an originating server, which generates a correlating identifier, and transmits the correlating identifier and processing information associated with the transaction event to a central data log accessible by the multiple communicating servers associated with the payment processing system. The transaction event is then processed by one or more intermediate servers before being processed by a terminating server, each successive intermediate server receiving the transaction event and a correlation identifier associated with the transaction event generated by the previous server which processed the transaction event. Each successive intermediate server processes the transaction event, generates a correlation identifier for the transaction event, transmits both the received and generated correlation identifiers for saving in the central transaction log, and transmits the transaction event to the next server until the transaction event reaches a terminating server. The terminating server completes the processing of the transaction event, generates a correlation identifier for the transaction event, and transmits both the received and generated correlation identifiers for saving in the central transaction log. The payment processing system receives a query from an agent associated with the payment processing system comprising a correlation identifier associated with the transaction event. The payment processing system extracts entries from the central data log associated with the transaction event by matching corresponding correlation identifiers and generates a transaction event history by ordering the extracted entries chronologically according to time stamps within each entry.

In certain other example aspects described herein, systems and computer program products to obtain a transaction event history from a central data log accessible by a plurality of communicating servers of a payment processing system are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
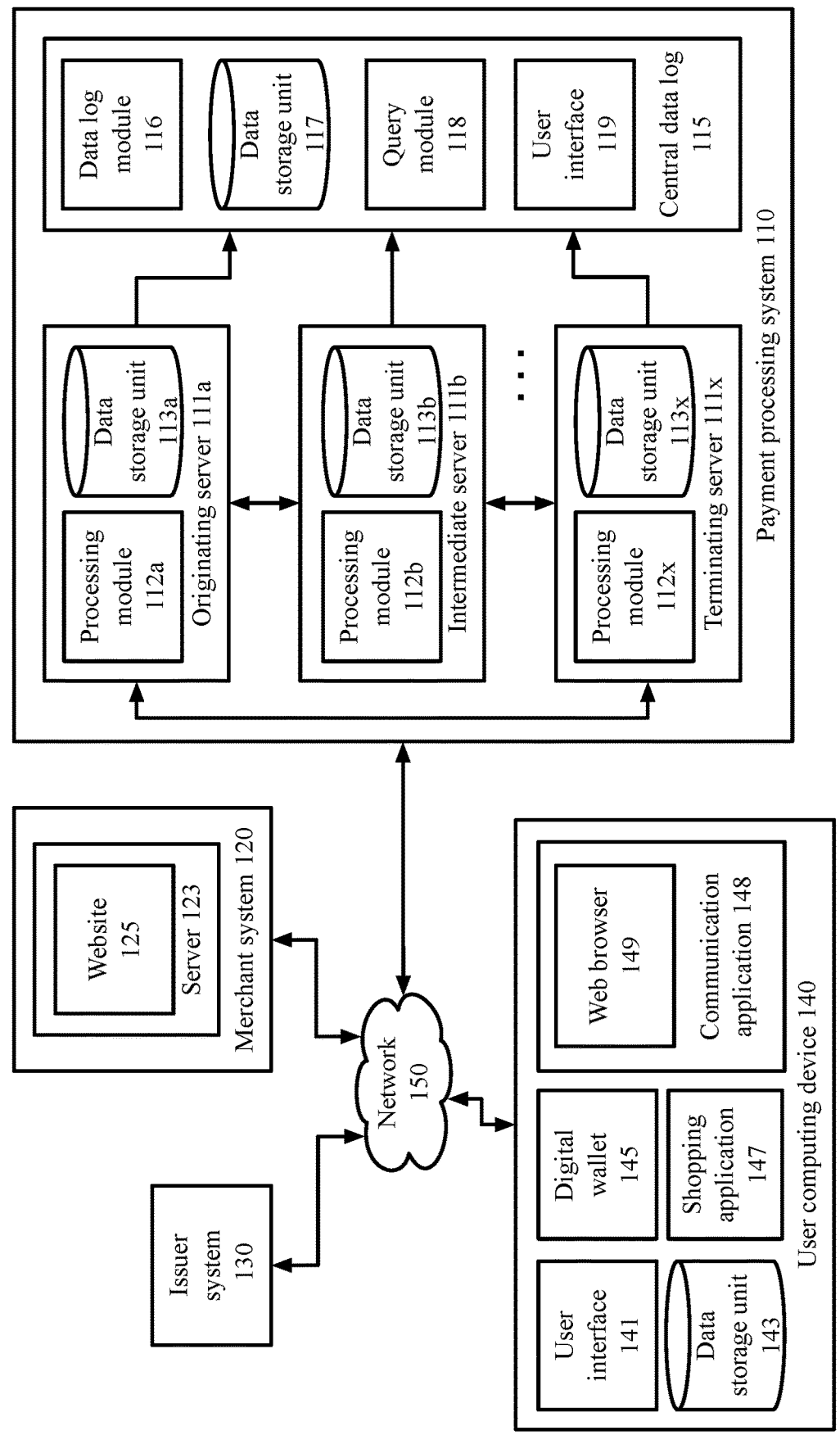
FIG. 1 is a block diagram depicting a system for obtaining a transaction event history from a central data log accessible by a plurality of communicating servers of a payment processing system, in accordance with certain example embodiments.

The example embodiments described herein provide computer-implemented techniques for obtaining a transaction event history from a central data log accessible by a plurality of communicating servers of a payment processing system.

In an example embodiment, a transaction event initiated by a user is processed by multiple communicating servers associated with a payment processing system. In another example embodiment, the transaction event is processed by multiple communicating processors. In this example embodiment, the multiple communicating processors may reside on a single computing device or may reside on more than one computing device. In other example embodiments, a non-transaction processing event is processed. In the example embodiments described herein, the transaction event is first processed by an originating server, which generates a correlating identifier, and transmits the correlating identifier and processing information associated with the transaction event to a central data log accessible by the multiple communicating servers associated with the payment processing system. The transaction event is then processed by one or more intermediate servers in succession before being processed by a terminating server. Each successive intermediate server receives the transaction event and a generated correlation identifier associated with the transaction event from the previous server which processed the transaction event. Each successive intermediate server processes the transaction event, generates a correlation identifier for the transaction event, transmits both the received and generated correlation identifiers for saving in the central transaction log, and transmits the transaction event to the next server until the transaction event reaches a terminating server.

The terminating server completes the processing of the transaction event, generates a correlation identifier for the transaction event, and transmits both the received and generated correlation identifiers for saving in the central transaction log. In another example embodiment, the processing of a transaction event is interrupted before the transaction event reaches the terminating server. In this example embodiment, the last one or more intermediate servers to process the transaction are considered terminating servers. Thus, a terminating server is a server that does not communicate the transaction event to another server after processing the transaction event. The payment processing system receives a query from an agent associated with the payment processing system comprising a correlation identifier associated with the transaction event. The payment processing system extracts entries from the central data log associated with the transaction event by matching corresponding correlation identifiers and generates a transaction event history.

In an example embodiment, transaction event processing is initiated. For example, a user accesses a merchant website via a user computing device, adds one or more items to an electronic shopping cart, selects an option to check out, selects an option to pay with a digital wallet account, selects a payment option via a digital wallet application associated with the digital wallet account, and selects an option to initiate a digital wallet transaction. In another example, a user initiates a transaction with a merchant system at a point of sale ("POS") device.

An originating server associated with a payment processing system processes the initiated transaction event and logs transaction event data in a central data log accessible to servers of the payment processing system. For example, the originating server receives the initiated transaction event, generates a current timestamp, and processes the transaction event. The originating server creates a correlation identifier for the transaction event and transmits the correlation identifier, the current timestamp, and processing details for entry into the central data log. The originating server transmits the transaction event and generated correlation identifier to one or more intermediate servers for further processing.

One or more intermediate servers associated with the payment processing system process the transaction event and log transaction event data in the central data log. In an example embodiment, after being processed by the originating server, the transaction event passes through one or more intermediate servers for further processing before being sent to a terminating server for final processing. In an example embodiment, an intermediate server receives the transaction event from the originating server and the correlation identifier generated by the originating server. In another example embodiment, an intermediate server receives the transaction event from another intermediate server and the correlation identifier generated by the other intermediate server. In yet another example embodiment, the originating server acts as an intermediate server in that it receives the transaction event with corresponding generated correlation identifier from an intermediate server for further processing at a time after initial processing by the originating server.

Thus, in the example embodiments described herein, each intermediate server receives, from a previous server that processed the transaction event, the transaction event and a correlation identifier generated by the previous server. Each intermediate server generates a current timestamp, processes the transaction event, and generates a correlation identifier for the transaction event. Each intermediate server transmits the received correlation identifier generated by the previous server, the generated correlation identifier, the current timestamp, and processing details associated with the transaction event for entry in the central data log. Each intermediate server transmits the transaction event and generated correlation identifier to one or more other intermediate servers, if more than one processing step remains, or to a terminating server, if only one processing step remains, for further processing.

If only one processing step remains, the terminating server processes the transaction event and logs transaction event data in the central data log. For example, the terminating server receives the transaction event and the correlation identifier generated by the previous intermediate server. For example, the previous intermediate server is the server that processed the transaction event and transmitted the transaction event to the terminating server. The terminating server generates a current timestamp, processes the transaction event, and generates a correlation identifier for the transaction event. The terminating server transmits the received correlation identifier generated by the previous server, the generated correlation identifier, the current timestamp, and processing details associated with the transaction event for entry in the central data log.

In an example embodiment, the payment processing system receives a query associated with the transaction event. For example, an agent of the payment processing submits, via a user interface, a query comprising a correlation identifier generated by one of the servers of the payment processing system corresponding to the transaction event. In another example, the query comprises data corresponding to a correlation identifier generated by one of the servers of the payment processing system corresponding to the transaction event. The payment processing system extracts or identifies the primary correlation identifier associated with the query. The payment processing system extracts a set of one or more entries from the central data log associated with the primary correlation identifier. The payment processing system identifies, from the set of extracted entries from the central data log, one or more secondary correlation identifiers corresponding to the primary correlation identifier. The payment processing system extracts a set of entries from the central data log associated with each of the secondary correlation identifiers.

In the example embodiments described herein, the payment processing system identifies a subsequent tier of correlation identifiers associated with the previous tier of correlation identifiers in the set of extracted entries. In the example embodiments described herein, the payment processing system continues to extract a set of entries from the central data log associated with a current tier of correlation identifiers until no new correlation identifiers are identified from an extracted set of entries from the central data log. For example, the payment processing system identifies, from the extracted set of entries, one or more tertiary correlation identifiers associated with the identified secondary correlation identifiers and extracts a set of entries from the central data log associated with each of the tertiary correlation identifiers. In this example, the payment processing system identifies no new correlation identifiers associated with the identified tertiary correlation identifiers from the extracted set of entries.

In an example embodiment, the payment processing system orders the extracted entries from the central data log associated with the transaction event according to timestamp and outputs a transaction event history. For example, each entry from the central data log comprises processing details associated with the transaction event. For example, the transaction event history may comprise a list of the extracted entries from the central data log organized by timestamp. For example, the transaction event history may read "15:10, request ID—15:12, request ID, payment ID—15:13, payment ID, vendor key ID." An example transaction event history enables an agent of the payment processing system to trace the history of the transaction event as it was processed and communicated among servers associated with the payment processing system.

By using and relying on the methods and systems described herein, a payment processing system may log transaction event data from each of a plurality of servers in a central data log as transaction events are processed by the plurality of servers. Additionally, by having each particular server transmit data to the central data log in a format specific to the particular server, the payment processing system does not need to reformat the plurality of servers to transmit data to the central data log in a standardized format. Additionally, by having each particular server transmit data to the central data log comprising a generated correlation identifier and, if applicable, a received correlation identifier from a server that processed the transaction event previous to the particular server, the payment processing system may generate a transaction event history by extracting and linking together data entries from the central data log having matching correlation identifiers.

Example System Architecture

Turning now to the drawings, in which like numerals indicate like (but not necessarily identical) elements throughout the figures, example embodiments are described in detail.

FIG. 1 is a block diagram depicting a system 100 obtaining a transaction event history from a central data log accessible by a plurality of communicating servers of a payment processing system, in accordance with certain example embodiments. As depicted in FIG. 1, the system 100 includes network computing devices 110, 120, 130, and 140 that are configured to communicate with one another via one or more networks 150. In some embodiments, a user associated with a device must install an application and/or make a feature selection to obtain the benefits of the techniques described herein.

In example embodiments, the network 150 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 150. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 are operated by payment processing system 110 operators, merchant system 120 operators, issuer system 130 operators, and users, respectively.

An example payment processing system 110 comprises one or more originating servers 111*a*, one or more intermediate servers 111*b*, one or more terminating servers 111*x*, and a central data log 115. In the example embodiments described herein, the one or more communicating servers process a transaction event. In certain example embodiments, one or more of the communicating servers comprise offline processors. In these example embodiments, any functions described herein as performed by one or more servers may also be performed by one or more processors. In certain example embodiments, the payment processing system 110 comprises one or more communicating processors residing on a computing device. In certain other example embodiments, the payment processing system 110 comprises one or more communicating processors residing on more than one computing device. In these example embodiments, any functions described herein as performed by one or more servers may also be performed by one or more processors residing on one or more computing devices.

In the example embodiments described herein, the classification of a server of the payment processing system as an originating server 111a, an intermediate server 111b, and a terminating server 111x is with respect to the order in which a transaction event is processed and does not necessarily imply a difference in structure of the servers, although each particular server may comprise a structure that is suitable to the one or more functions of the particular server to process the transaction event. For example, one or more originating servers 111a create and initially processes a transaction event or are the first servers to process a transaction event received from outside of the payment processing system 110. Thus, the one or more originating servers 111a do not receive the transaction event from another server of the payment processing system 110 prior to processing. For example, the one or more originating servers 111a receive the transaction event from a merchant system 120 or a user computing device 110. In the example embodiments described herein, the one or more originating servers 111a communicate the transaction event to one or more intermediate servers 111b, which further process the transaction event.

In the example embodiments described herein, one or more intermediate servers 111b receive a transaction event transmitted by one or more originating servers 111a and/or by one or more other intermediate servers 111b. In the example embodiments described herein, the one or more intermediate servers 111b transmit to the transaction event to one or more other intermediate servers 111b or to one or more terminating servers 111x for further processing. In an example embodiment, the transaction event may pass through a chain of intermediate servers 111b before reaching a terminating server 111x, or through several chains of intermediate servers 111b that branch off from one or more intermediate servers 111b or from one or more originating servers 111a. For example, if an originating server 111a or an intermediate server 111b communicates the transaction event to more than one other intermediate server 111b after processing, multiple chains of intermediate servers 111b are established for processing the transaction event.

In the example embodiments described herein, one or more of the originating servers 111a may also act as one or more intermediate servers 111b or as one or more terminating servers 111x. For example, the transaction event is first processed by an originating server 111a, then the originating server 111a communicates the transaction event to a first intermediate server 111b, the first intermediate server 111b communicates the event back to the originating server 111a, which is now acting as a second intermediate server 111b. In this example, the originating server 111a may then transmit the transaction event to a third intermediate server 111b, which transmits the transaction event back to the originating server 111a, which finishes the processing of the transaction event, acting as a terminating server 111x. Additionally, in certain of the example embodiments described herein, one or more of the intermediate servers 111b may also act as one or more of the terminating servers 111x. For example, an intermediate server 111b receives a transaction event from one or more originating servers 111a, processes the transaction event, transmits the transaction event to one or more other intermediate servers 111b that further process the transaction event, and receives the transaction event from one or more intermediate servers 111b for final processing by the intermediate server 111b acting as a terminating server 111x. In another example embodiment, one or more intermediate servers 111b repeat a process periodically for a determined period of time. In this example embodiment, an intermediate server 111b acts as a terminating server 111x when it repeats the process for the last time.

In the example embodiments described herein, a terminating server 111x does not communicate the transaction event to another server after processing. In an example embodiment, the one or more terminating servers 111x do not communicate the transaction event to another server because processing of the transaction event is complete. In another example embodiment, the one or more terminating servers 111x do not communicate the transaction event to another server because processing of the transaction event is interrupted after processing by the one or more terminating servers 111x. For example, one or more intermediate servers 111b are unable to communicate the transaction event to one or more other servers, therefore, in the example embodiments described herein, these intermediate servers 111b are considered terminating servers 111x since they do not further communicate the transaction event.

An example originating server 111a, intermediate server 111b, and terminating server 111x comprise a processing module 112a, 112b, and 112x, and a data storage unit 113a, 113b, and 113x, respectively.

An example processing module 112a, 112b, or 112x resides on a server of the payment processing system. In the example embodiments described herein, a processing module 112a resides on an originating server 111a, a processing module 112b resides on an intermediate server 111b, and a processing module 112x resides on a terminating server 111x. The example processing module 112a, 112b, or 112x processes a transaction event and facilitates the communication between the server on which the processing module 112a, 112b, or 112x resides and one or more other servers of the payment processing system 110 to receive a transaction event and/or process a transaction event and/or transmit a transaction event for further processing. The example processing module 112a, 112b, or 112x, after processing the transaction event, transmits an entry to the central data log 115 of the payment processing system 110. For example, the entry comprises the correlation ID received from a server that previously processed the transaction event (if applicable), a correlation ID generated by the current server processing the transaction event, a current timestamp, and processing details. In this example, the "current server" is the server transmitting the entry to the central data log 115. Example processing details comprise a summary of any processing steps completed by the current server in processing the transaction event.

In an example embodiment, the processing module 112a residing on an originating server 111a originally processes a transaction event, transmits an entry to the central data log 115, and transmits the transaction event to one or more intermediate servers 111b. In an example embodiment, the processing module 112b residing on an intermediate server 111b receives the transaction event from an originating server 111a and/or an another intermediate server 111a, processes the transaction event, transmits an entry to the central data log 115, and transmits the transaction event to one or more other intermediate servers 111b, to the originating server 111a acting as an intermediate server 111b, and/or to a terminating server 111c. In an example embodiment, the processing module 112c residing on a terminating server receives the transaction event from one or more intermediate servers 111b and/or from an originating server 111*a* acting as an intermediate server 111*b*, processes the transaction event, and transmits an entry to the central data log 115.

An example data storage unit 113*a*, 113*b*, or 113*x* resides on a server of the payment processing system. In the example embodiments described herein, the data storage unit 113*a* resides on an originating server 111*a*, the data storage unit 113*b* resides on an intermediate server 111*b*, and the data storage unit 113 resides on a terminating server 113*x*. An example data storage unit 113*a*, 113*b*, or 113*x* comprises a local or remote data storage structure accessible to a corresponding server 111*a*, 111*b*, or 111*x* suitable for storing information. In an example embodiment, the data storage unit 113*a*, 113*b*, or 113*x* stores encrypted information, such as HTML5 local storage. In an example embodiment, the data storage unit 113*a*, 113*b*, or 113*x* stores processing details, timestamps, correlation IDs, and any other useful or relevant information received by or generated by the server on with the data storage unit 113*a*, 113*b*, or 113*x* resides.

An example central data log 115 comprises a data log module 116, a data storage unit 117, a query module 118, and a user interface 119. In the example embodiments described herein, the central data log 115 is able to receive communications comprising data entries from one or more servers of the payment processing system 110, including one or more originating servers 111*a*, one or more intermediate servers 111*b*, and/or one or more terminating servers 111*c*. In an example embodiment, the central data log 115 receives entries from the one or more servers of the payment processing system 110 via an internal network of the payment processing system 110. In an example embodiment, the central data log 115 comprises a tracing repository for storing entries associated with transaction events processed by the plurality of servers of the payment processing system 110.

An example central data log module 116 receives data entries from each server of the plurality of servers of the payment processing system 110. In an example embodiment, the central data log module 116 receives one or more entries via an internal network of the payment processing system 110. In another example embodiment, the central data log module 116 receives one or more entries via the network 150. An example data entry received from an originating server 111*a* comprises comprising a correlation identifier generated by the originating server 111*a*, a current timestamp generated by the originating server 111*a*, and processing details generated by the originating server 111*a*. In an example embodiment, the central data log 115 further receives, from the originating server 111*a*, a server identifier identifying the originating server 111*a*. An example server identifier comprises a physical machine identifier, an IP address, a logical machine identifier, a hostname associated with the server, a service name associated with the server, or another relevant or applicable server identifier. An example data entry received from an intermediate server 111*b* or terminating server 111*c* comprises a correlation identifier generated by the intermediate server 111*b* or the terminating server 111*c*, a correlation identifier generated by the originating server 111*a* or other intermediate server 111*b* that processed the transaction event previous to the intermediate server 111*b* or the terminating server 111*c*, a current timestamp generated by the intermediate server 111*b* or the terminating server 111*c*, and processing details generated by the intermediate server 111*b* or the terminating server 111*c*. In an example embodiment, the central data log 115 further receives, from the intermediate server 111*b* or the terminating server 111*c*, a server identifier identifying the intermediate server 111*b* or terminating server 111*c*.

In an example embodiment, the central data log module 116 stores each data entry received from servers of the plurality of servers of the payment processing system 110. In an example embodiment, the central data log module 116 maintains a table, wherein each row of the table comprises a saved entry. In another example embodiment, the central data log module 116 maintains a text file, wherein each line of the text file comprises a saved entry. In an example embodiment, the central data log 116 formats the data entries before saving the data entries. For example, before inserting the data entry into a table, the central data log module 116 formats the data entry such that the first one or more cells comprise correlation identifiers, the next cell comprises a current timestamp, and the next cell comprises processing details. In an example embodiment, the central data log module 116 saves each entry in the data storage unit 117 of the central data log 115. In an example embodiment, the central data log module 116 communicates with the query module 118. In this example embodiment, the central data log module 116 extracts one or more entries from the central data log 115 corresponding to data received from the query module 118. For example, the central data log module 116 receives a query comprising a correlation identifier from the query module 118 and extracts one or more entries comprising the received correlation identifier and transmits the entries to the query module 118.

An example data storage unit 117 comprises a local or remote data storage structure accessible to the central data log 115 suitable for storing information. In an example embodiment, the data storage unit 117 stores encrypted information, such as HTML5 local storage. In an example embodiment, the data storage unit 117 stores data entries saved by the central data log module 116. In an example embodiment, the data storage unit 117 is accessible to the central data log module 116 to extract one or more entries corresponding to a query received from the query module 118. In another example embodiment, the data storage unit 117 is accessible to the query module 118 to extract entries saved by the central data log module 116.

An example query module 118 receives a query from an agent associated with the payment processing system 110. For example, the query module 118 receives the query via the user interface 119. For example, the payment processing system 110 comprises a computing device associated with the agent that enables the agent to transmit queries associated with transaction events processed by the plurality of servers of the payment processing system 110. An example query comprises a correlation identifier associated with a transaction event. In an example embodiment, the query module 118 communicates with the central data log module 116 to extract one or more entries comprising the correlation identifier from the central data log 115. In another example embodiment, the query module 118 extracts the one or more entries comprising the correlation identifier from the central data log 115. In another example embodiment, the query comprises data associated with a transaction event. In this example embodiment, the query module 118 extracts or communicates with the central data log module 116 to extract an entry from the central data log 115 comprising the data received in the query. In this example embodiment, from the extracted entry, the query module 118 identifies a correlation identifier and extracts or communicates with the central data log module 116 to extract one or more entries from the central data log 115 corresponding to the identified correlation identifier.

In an example embodiment, from the extracted one or more entries, the query module 118 identifies a subsequent set of one or more correlation identifiers different from the correlation identifier received in the query. In this example embodiment, the query module 118 extracts or communicates with the central data log module 116 to extract a subsequent set of one or more entries from the central data log 115 comprising one or more of the subsequent set of one or more correlation identifiers. In the example embodiments described herein, the query module 118 continues to identify subsequent sets of new correlation identifiers and extract entries comprising the new sets of correlation identifiers until no new correlation identifiers are identified by the query module 118 from any of the extracted entries from the central data log 115. In an example embodiment, the query module generates a transaction event history by ordering the extracted entries according to a current timestamp in each entry and transmitting the transaction event history to the agent associated with the agent of the payment processing system. In an example, the query module 118 causes the transaction event history to be displayed on the user interface 119.

An example user interface 119 resides on a computing device (not depicted) associated with an agent of the payment processing system 110. In an example embodiment, the agent transmits, via the user interface 119 and to the payment processing system 110, a query associated with a transaction event and comprising a correlation identifier or data associated with the transaction event. In an example embodiment, the payment processing system 110 generates a transaction event history and displays the transaction event history to the agent via the user interface 119.

An example merchant system 120 comprises a server 123 and a website 125.

An example merchant system server 123 provides the content accessible by the user 101 through the web browser 149 or shopping application 147 on the user computing device 140, including but not limited to html documents, images, style sheets, and scripts. In an example embodiment, the server 123 supports the merchant system website 125.

An example merchant system website 125 comprises a shopping website associated with the merchant system 120. In an example embodiment, a user associated with a user computing device 140 initiates a transaction event by selecting an option to purchase one or more items from the merchant system website 125 via the user computing device 140. For example, the user selects one or more items from the website 125 to add to an electronic shopping cart, selects an option to check out, and selects an option to pay using a digital wallet account. In certain other example embodiments, instead of initiating a transaction event via a merchant system website 125, the user initiates a transaction event by initiating a purchase of one or more items at a point of sale device (not depicted) of the merchant system 120 operated by an agent of the merchant system 120 at a physical location of the merchant system 120.

In certain other example embodiments, instead of initiating a transaction event with a merchant system 120 processed by the payment processing system 110, a processing event with another system (not depicted) is initiated, such as a manufacturing system, a secure access system, or a logistics system.

An example issuer system 130 is an issuer of a credit card account associated with a user that initiates a transaction event with the merchant system 120. In an example embodiment, the issuer system 130 communicates with one or more servers of the payment processing system 110 to process the transaction event.

An example user computing device 110 comprises a user interface 141, a data storage unit 143, a digital wallet application 145, a shopping application 147, a communication application 148, and a web browser 149.

An example user interface 141 may be a touch screen, a voice-based interface or any other interface that allows a user to provide input and receive output from an application or module on the user computing device 140. In an example embodiment, the user interface 141 enables the user to interact with the digital wallet application 145, the shopping application 147, and/or the web browser 149 resident on the user computing device 140. For example, the user interacts with the shopping application 147 and/or the web browser 149 to purchase one or more items from the merchant system website 125 and pay using a digital wallet account. In an example embodiment, the user selects an option to pay using a digital wallet account via the user interface 141, initiating a transaction event at a point of sale device (not depicted) associated with the merchant system 120. In an example embodiment, the user selects payment information via the user interface 141 for the transaction using the digital wallet application 125.

An example data storage unit 143 comprises a local or remote data storage structure accessible to the user computing device 140 suitable for storing information. In an example embodiment, the data storage unit 143 stores encrypted information, such as HTML5 local storage.

An example digital wallet application 145 is a program, function, routine, applet, or similar entity that exists on and performs its operations on the user computing device 140. In certain embodiments, the user must install the digital wallet application 145 and/or make a feature selection on the user computing device 140 to obtain the benefits of the techniques described herein. In an example embodiment, the digital wallet application 145 communicates with the payment processing system 110, which manages a digital wallet account associated with the user. In an example embodiment, the user may add payment information to and/or edit payment information in the user's digital wallet account managed by the payment processing system 110 using the digital wallet application 145 on the user computing device 140. In an example embodiment, when a user selects an option to pay for an online transaction on the merchant website 125 using a digital wallet account or for a transaction with a point of sale device (not depicted) at a physical location of the merchant system 120, the digital wallet application 145 displays a request for the user to select payment information to use in the transaction. In this example embodiment, the user selects payment information to use in the transaction via the digital wallet application 145.

An example shopping application 147 is a program, function, routine, applet, or similar entity that exists on and performs its operations on the user computing device 140. In certain embodiments, the user must install the shopping application 147 and/or make a feature selection on the user computing device 140 to obtain the benefits of the techniques described herein. In an example embodiment, the shopping application 147 communicates over the network 150 with the merchant system website 125. In an example embodiment, the user selects one or more items from the website 125 for purchase via the shopping application 147. In an example embodiment, the user selects an option on the shopping application 147 to purchase the one or more items.

In an example embodiment, the user selects an option to initiate a transaction with the merchant system website 125 using a digital wallet account associated with the user using the shopping application 147. In an example embodiment, one or more features described as being performed by the shopping application 147 may also be performed by a web browser 149 application operating on the user computing device 140

In an example embodiment, the user associated with the user computing device 140 can use a communication application 148, such as a web browser 149 application or a stand-alone application, to view, download, upload, or otherwise access documents or web pages via a distributed network 150.

In an example embodiment, the web browser 149 can enable the user associated with the user computing device 140 to interact with web pages using the user computing device 140. In an example embodiment, the user accesses the merchant website 125 via the web browser 149. In an example embodiment, the user selects one or more items from the website 125 for purchase via the web browser 149. In an example embodiment, the user selects an option on the merchant website 125 via the web browser 149 to purchase the one or more items. In an example embodiment, the user selects an option to initiate a transaction with the merchant system website 125 using a digital wallet account associated with the user using the web browser 149. In an example embodiment, one or more features described as being performed by the web browser 149 may also be performed by the shopping application 147.

It will be appreciated that the network connections shown are example and other means of establishing a communications link between the computers and devices can be used. Moreover, those having ordinary skill in the art having the benefit of the present disclosure will appreciate that the payment processing system 110, the merchant system 120, the issuer system 130, and the user computing device 140 illustrated in FIG. 1 can have any of several other suitable computer system configurations. For example, a user computing device 110 embodied as a mobile phone or handheld computer may or may not include all the components described above.

Figure 8:
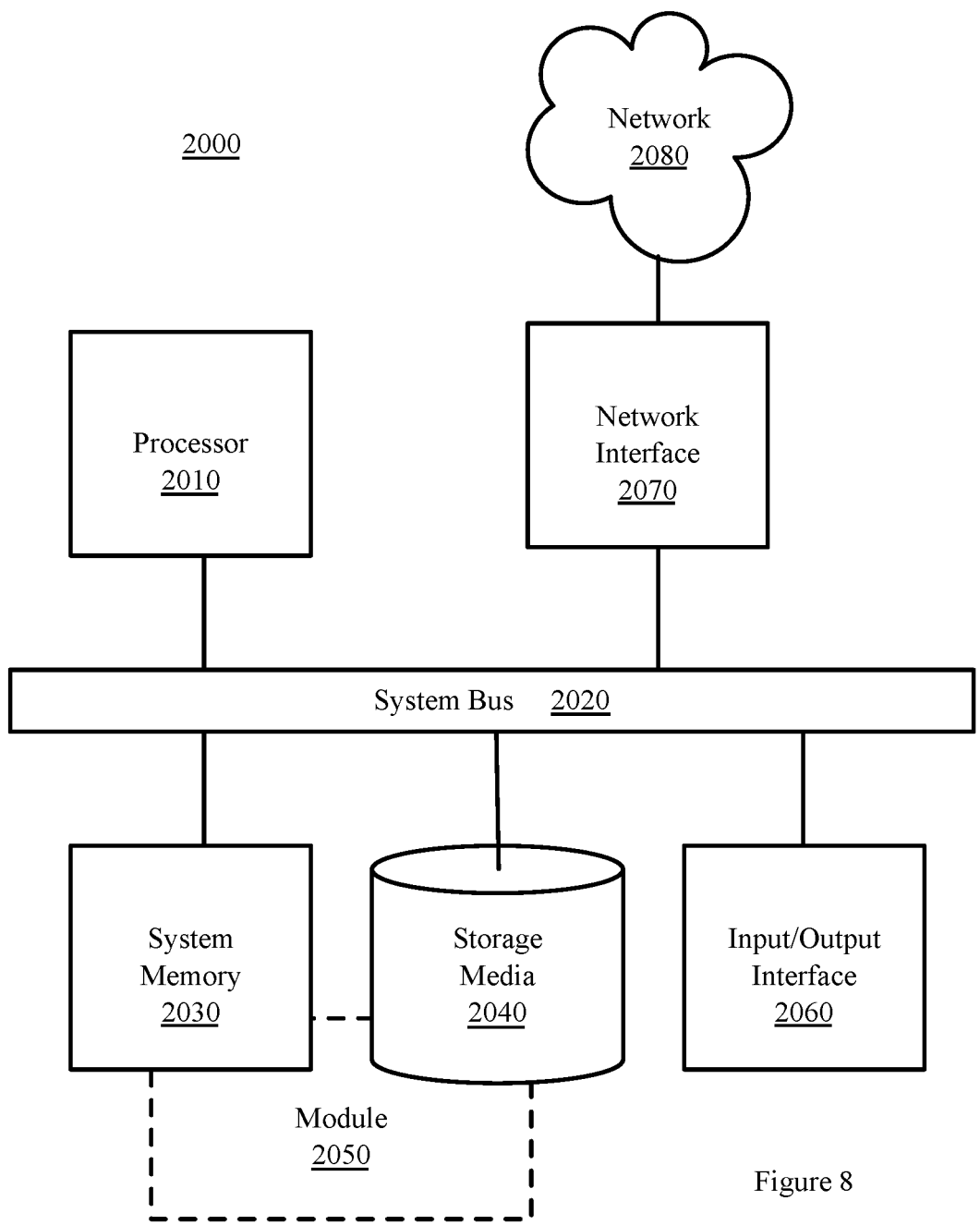
FIG. 8 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 150. The network 150 may include any type of data or communications network, including any of the network technology discussed with respect to FIG. 8.

Example Processes

The example methods illustrated in FIGS. 2-7 are described hereinafter with respect to the components of the example operating environment 100. The example methods of FIGS. 2-7 may also be performed with other systems and in other environments.

The example embodiments described herein describe a payment processing system 110 generating a transaction event history for a transaction event processed by a plurality of communicating servers associated with the payment processing system 110. However, in certain other example embodiments, the plurality of communication servers are associated with a system other than a payment processing system 110 and/or do not process a transaction event. For example, a manufacturing system or a logistics system may generate an event history for an event processed by a plurality of communicating servers associated with the corresponding system.

In the example embodiments described herein, an event goes through a series of processing steps or tasks performed by a plurality of communicating servers. An example transaction event goes through a series of processing steps or tasks associated with a user-initiated transaction that are performed by a plurality of communicating servers associated with a payment processing system 110.

Figure 2:
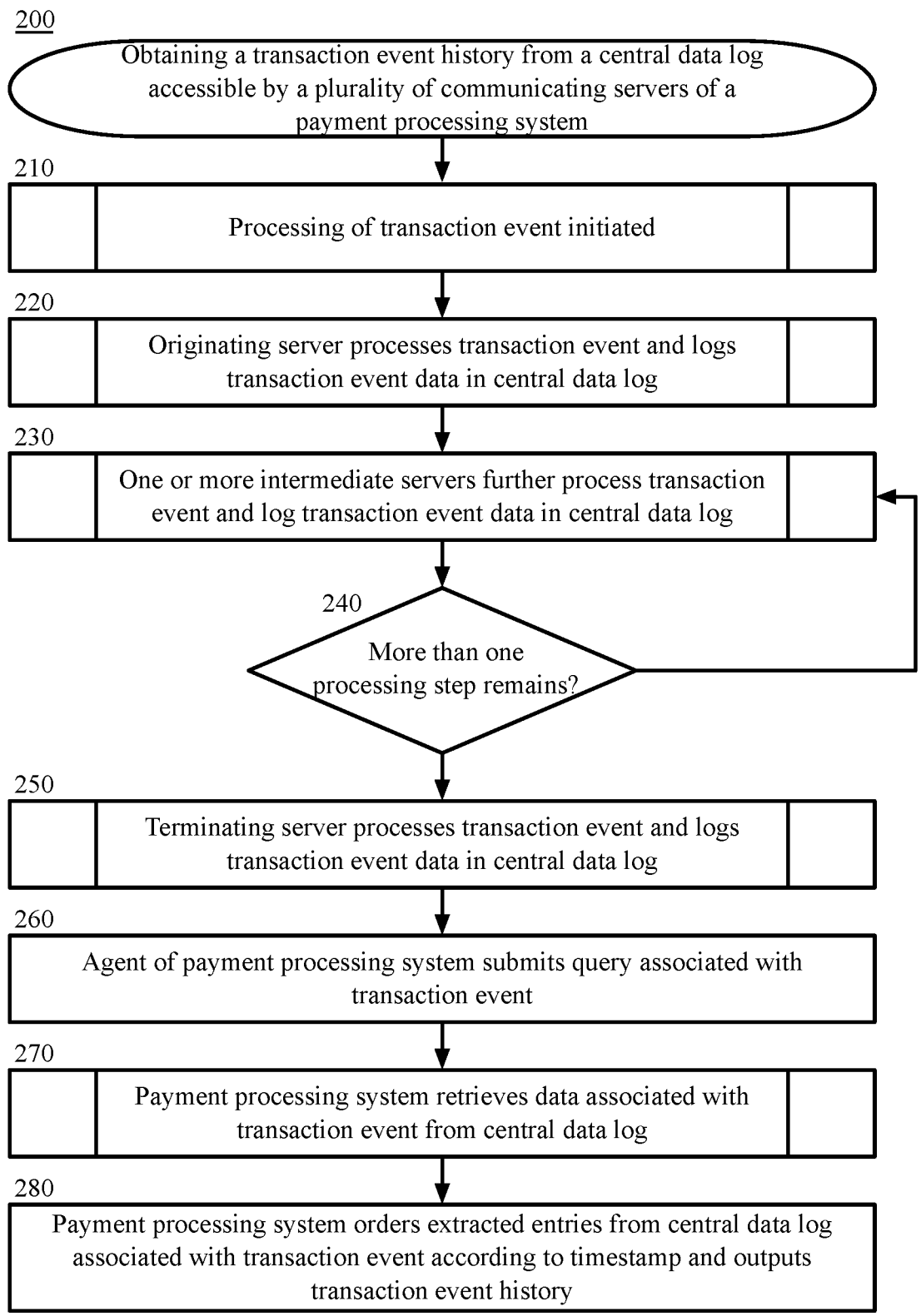
FIG. 2 is a block flow diagram depicting a method for obtaining a transaction event history from a central data log accessible by a plurality of communicating servers of a payment processing system, in accordance with certain example embodiments.

FIG. 2 is a block diagram depicting a method 200 for obtaining a transaction event history from a central data log 115 accessible by a plurality of communicating servers of a payment processing system 110, in accordance with certain example embodiments, in accordance with certain example embodiments. The method 200 is described with reference to the components illustrated in FIG. 1.

In block 210, processing of a transaction event is initiated. The method for initiating the processing of a transaction event is described in more detail hereinafter with reference to the method described in FIG. 3.

The example embodiments described herein describe a plurality of communicating servers associated with a payment processing system 110 processing a transaction event. However, in certain other example embodiments, the plurality of communication servers are not associated with a payment processing system 110 and/or do not process a transaction event. For example, the plurality of communicating servers may process a request to access a secure system, determine the logistics for a shipment, or manage the manufacturing of a product.

Figure 3:
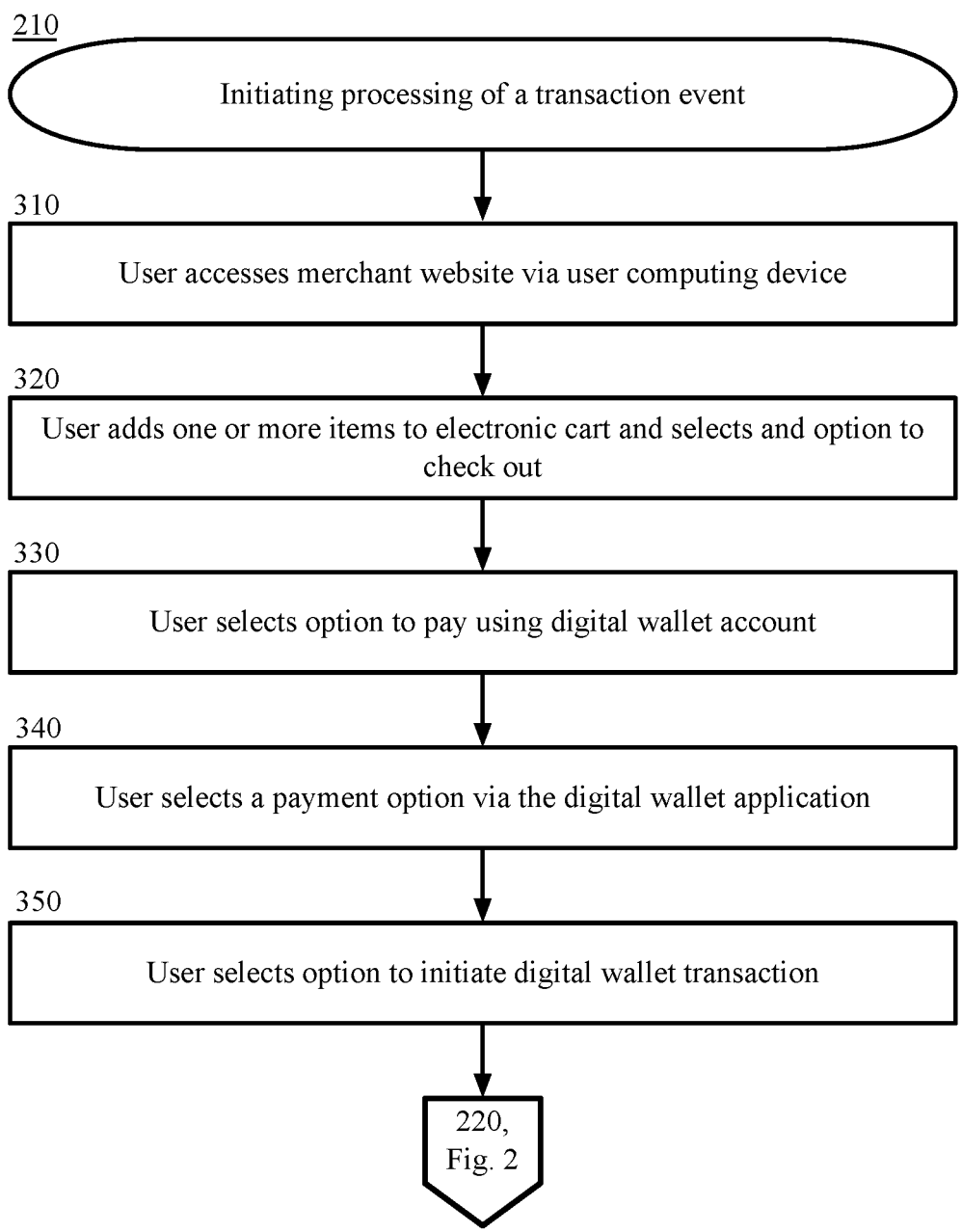
FIG. 3 is a block flow diagram depicting a method for initiating processing of a transaction event, in accordance with certain example embodiments.

FIG. 3 is a block diagram depicting a method 210 for initiating the processing of a transaction event, in accordance with certain example embodiments. The method 210 is described with reference to the components illustrated in FIG. 1.

In the example embodiments described herein, a user initiates a transaction event by initiating an online purchase with a merchant system website 125 using a user computing device 140. In other example embodiments, the user may initiate a transaction event by conducting a transaction at a point of sale system of the physical location of the merchant system 120 or otherwise initiate a transaction event.

In block 310, a user 101 accesses a merchant system website 125 via a user computing device 110. In an example embodiment, the merchant system website 125 provides an interface wherein the user can browse items on the website 125 and select one or more items for purchase. In an example embodiment, the user enters the merchant system website 125 address into the web browser 149 or otherwise accesses the merchant system website 125 via the web browser 149. In an example, the user actuates a user interface 141 object for a merchant system 120 advertisement on the web browser 149 and the web browser 149 redirects to the reservation website 125. In another example embodiment, the user accesses the merchant system reservation website 125 via a merchant system shopping application 147 resident on the user computing device 140 that communicates with the merchant system 120 over the network 150. For example, the user downloads the shopping application 147 from the merchant system 120 over the network 150 and later accesses the merchant system website 125 by interacting with the shopping application 147.

In block 320, the user adds one or more items to an electronic shopping cart and selects an option to check out. For example, the user adds one or more items on the merchant system website 125 to an electronic cart by selecting one or more objects on the user interface 141 of the user computing device 140. In this example, the user selects one or more objects on the user interface 141 to instruct the website 125 that the user is ready to purchase the one or more items added to the electronic cart. In another example embodiment, the user presents one or more items to an agent of the merchant system 120 operating a merchant point of sale device at a physical location of the merchant system 120.

In block 330, the user selects an option to pay using a digital wallet account. In an example embodiment, the user's 101 digital wallet account is associated with and managed by the payment processing system 110. In an example embodiment, the user actuates one or more objects on the user interface 141 to select an option to pay using the digital wallet account. In an example embodiment, in response to the user selecting an option to pay using the digital wallet account, the digital wallet application 145 opens on the user computing device 140. In an example embodiment, the digital wallet application 145 communicates with the payment processing system 110 over the network 150 and enables a user to interact with the user's digital wallet account.

In block 340, the user selects a payment option via the digital wallet application 145. In an example embodiment, the user's digital wallet account comprises payment account information associated with one or more financial accounts of the user. For example, the digital wallet account may comprise payment account information associated with one or more credit accounts, one or more debit accounts, one or more bank accounts, and/or one or more other financial accounts associated with the user. In an example embodiment, the digital wallet application 145 operating on the user computing device 140 displays payment options to the user associated with the payment account information saved in the user's digital wallet account. In an example embodiment, the digital wallet application 145 displays one or more objects on the user interface 141 that the user may actuate to select a payment option. In an example embodiment, the user selects a payment option from the digital wallet account by actuating one or more objects of the user interface 141 displayed by the digital wallet application 145 on the user computing device 140.

In block 350, the user selects an option to initiate a digital wallet transaction. In an example embodiment, the user actuates an object on the user interface 141 to instruct the digital wallet application 145 to confirm the transaction. For example, the user confirms that the user desires to purchase the one or more items with the selected payment instrument using the digital wallet account by actuating a user interface 141 object. For example, the user selects a user interface 141 object that reads "place my order."

From block 350, the method 210 proceeds to block 220 of FIG. 2.

Returning to FIG. 2, in block 220, an originating server 111*a* processes a transaction event and logs the transaction event a central data log. The method for processing a transaction event by an originating server 111*a* is described in more detail hereinafter with reference to the method 220 described in FIG. 4.

Figure 4:
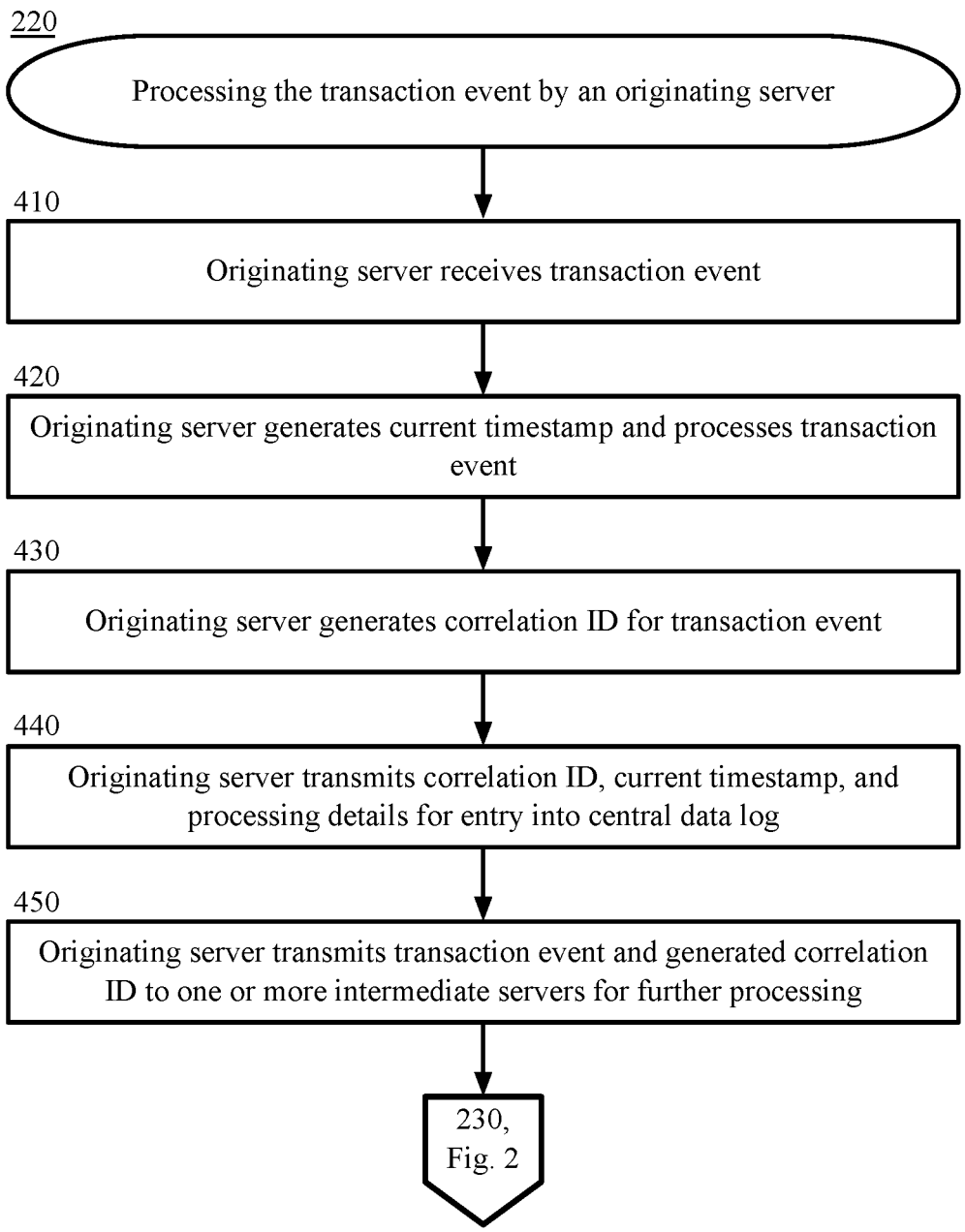
FIG. 4 is a block flow diagram depicting a method for processing a transaction event by an originating server, in accordance with certain example embodiments.

FIG. 4 is a block diagram depicting a method 220 for processing a transaction event by an originating server 111*a*, in accordance with certain example embodiments. The method 220 is described with reference to the components illustrated in FIG. 1.

In the example embodiments described herein, an originating server 111*a* is a first server of a plurality of communicating servers of the payment processing system 110 to process the transaction event before transmitting the transaction event to another server of the plurality of servers. In an example embodiment, an originating server 111*a* receives a transaction event from a system other than the payment processing system 110. In another example embodiment, an originating server 111*a* receives the transaction event from a module or server of the payment processing system 110 not associated with the plurality of communicating servers. In yet another example embodiment, an originating server 111*a* originally creates a transaction event.

In the example embodiments described herein, one originating server 111*a* originally processes the transaction event. However, in certain other example embodiments, more than one originating server 111*a* may originally process the transaction event. For example, two or more originating servers 111*a* may severally perform aspects of the original processing of the payment event concurrently and/or simultaneously. In an example, three originating servers 111*a* separately process a transaction event and then each of the servers transmits the transaction event to a common intermediate server 111*b*.

In block 410, an originating server 111*a* receives a transaction event. In an example embodiment, the payment processing system 110 receives data associated with the transaction event over the network 150 from the merchant system 120. For example, the originating server 111*a* receives the data associated with the transaction event from the merchant system website 125 in response to the user selecting an option to confirm the transaction initiated by the user. In another example, the originating server 111*a* receives the data associated with the transaction event from a point of sale device associated with the merchant system 120 at which the user initiates the transaction. In another example embodiment, the originating server 111*a* receives the data associated with the transaction event from the user computing device 140 over the network 150. In yet another example embodiment, the originating server 111*a* receives the data associated with the transaction event from a module or system associated with the payment processing system 110 or user computing device 140. In certain other example embodiments, the originating server 111*a* initiates a transaction event in response to receiving a request from the merchant system 120 or user computing device 140 to process a user-initiated transaction and accesses data necessary for processing the transaction event. For example, the originating server 111*a* retrieves data necessary for processing the transaction event from the data storage unit 113*a* residing on the originating server 111*a*.

In an example embodiment, the originating server 111*a* receives and/or accesses data associated with the transaction event comprising a name of the user, financial account information selected by the user, a total amount of the transaction, and/or any other relevant information for processing a transaction event initiated by the user at a merchant system 120 point of sale device or a merchant website 125. In another example embodiment, the originating server 111*a* receives and/or accesses data associated with a non-transaction event.

In block 420, the originating server 111*a* generates a current timestamp and processes the transaction event. An example current timestamp comprises a time zone and a month, day, year, hour, minute, and second at which the current timestamp was generated. For example, a current timestamp generated by the originating server 111*a* reads "1/21/2015, 15:25:21 Eastern Standard Time." In an example embodiment, the originating server 111*a* generates the current time stamp at the time the originating server 111*a* receives the transaction event. In another example embodiment, the originating server 111*a* generates the current time stamp at a time at which the originating server 111*a* begins processing the transaction event. In yet another example embodiment, the originating server 111*a* generates the current time stamp at a time at which the originating server 111*a* completes the processing of the transaction event. In the example embodiments described herein, the transaction event goes through a series of processing steps or tasks associated with a user-initiated transaction that are performed by a plurality of communicating servers associated with a payment processing system 110. In the example embodiments described herein, the originating server 111*a* processing the transaction event comprises processing the first step of a series of processing steps associated with the user-initiated transaction event.

In block 430, the originating server 111*a* generates a correlation identifier for the transaction event. In an example embodiment, the correlation identifier comprises alphanumeric and/or symbolic characters in a format specific to the originating server 111*a*. In this example embodiment, the correlation identifier format for the original server 111*a* may be unknown to one or more other servers of the payment processing system 110 that are involved in processing the transaction event. For example, each of the plurality of servers of the payment processing system 110 may use a different format for generating correlation identifiers for a transaction event. For example, the originating server 111*a* may generate a correlation identifier that associates the transaction event with a merchant system 120 identity. In another example, the generated correlation identifier may correspond to a transaction number, for example, transaction number 110,235. In another example, the generated correlation identifier may correspond to the current timestamp generated by the originating server 111*a*. In yet another example, the generated correlation identifier may correspond to an identity of the user that initiated the transaction event. In yet another example, the correlation identifier is generated based on more than one piece of information associated with the transaction event.

In block 440, the originating server 111*a* transmits the correlation identifier, the current timestamp, and processing details for entry into the central data log 115. In this example embodiment, the originating server 111*a* transmits the correlation identifier generated by the originating server 111*a* for the transaction event. In an example embodiment, processing details comprise a summary of one or more processing steps performed by the originating server 111*a* for the transaction event. For example, processing details may comprise "received request to process a transaction initiated by user A and payment information from merchant system B; stored request and payment information." In an example embodiment, the central data log 115 receives the data transmitted by the originating server and creates an entry in the central data log 115 comprising the correlation identifier generated by the originating server 111*a*, the current timestamp generated by the originating server 111*a*, and the processing details generated by the originating server 111*a*.

In an example embodiment, the originating server 111*a* further transmits a server identifier identifying the originating server 111*a* to the central data log 115. An example server identifier comprises a physical machine identifier, an IP address, a logical machine identifier, a hostname associated with the server, a service name associated with the server, or another relevant or applicable server identifier.

In an example embodiment, the central data log 115 stores the received data as an entry in a data table accessible by the central data log 115. An example entry associated with data received from an originating server 111*a* may comprise a string comprising the correlation identifier generated by the originating server 111*a*, the current timestamp generated by the originating server 111*a*, and the processing details generated by the originating server 111*a*.

In block 450, the originating server 111*a* transmits the transaction event and the generated correlation identifier to one or more intermediate servers 111*b* for further processing. In the example embodiments described herein, transmitting the transaction event comprises transmitting data associated with the transaction event to another server of the plurality of servers of the payment processing system 110 for further processing of the transaction event. In an example embodiment, the data associated with the transaction event transmitted by the originating server 111*a* to the one or more intermediate servers 111*b* is different than the data received by or accessed by the originating server 111*a* prior to the originating server 111*a* processing the transaction event. For example, the originating server 111*a* may have transformed the data, added data, or taken away data during the processing of the transaction event. In another example embodiment, the data associated with the transaction event transmitted by the originating server 111*a* to the one or more intermediate servers 111*b* is the same as the data received by or accessed by the originating server 111*a* prior to the originating server 111*a* processing the transaction event.

In certain example embodiments, the originating server 111*a* may, in addition to or instead of transmitting the transaction event and the generated correlation identifier to one or more intermediate servers 111*b* of the plurality of servers of the payment processing system 110, transmit the transaction event and the generated correlation identifier to a server or module outside of the plurality of servers associated with the payment processing system 110. For example, the originating server 111*a* transmits data associated with the transaction event to a server of a system not associated with the payment processing system 110 or to a server or module of the payment processing system 110 not associated with the plurality of communicating servers that process transaction events. For example, the originating server 111*a* may transmit the transaction event in the form of a payment authorization request to an issuer system 130 associated with the payment information selected by the user for use in the digital wallet transaction or may transmit the transaction event to an account management system that manages the user's digital wallet account associated with the payment processing system 110. In these example embodiments, in which the originating server 111*a* transmits the transaction event to a server outside of the plurality of servers associated with the payment processing system 110, the server receiving the transaction event from the originating server 111*a* further processes the transaction event and transmits the transaction event to one or more intermediate servers 111*b* of the plurality of servers of the payment processing system 110.

From block 450, the method 220 proceeds to block 230, in FIG. 2.

Returning to FIG. 2, in block 230, one or more intermediate servers 111b further process the transaction event and log transaction event data in the central data log 115. The method for processing the transaction event by an intermediate server 111b is described in more detail hereinafter with reference to the method 330 described in FIG. 5.

In an example embodiment, the one or more intermediate servers 111b receive the generated correlation identifier and the data associated with the transaction event from the originating server 111a via an internal network of the payment processing system 110.

In another example embodiment, the one or more intermediate servers 111b receive data associated with the transaction event from a server or module not associated with the plurality of servers of the payment processing system 110 for further processing. In an example, the server or module not associated with the plurality of servers of the payment processing system 110 may retransmit the correlation identifier generated by the originating server 111a via the network 150 to the one or more intermediate servers 111b along with data associated with the transaction event. In this example, the one or more intermediate servers 111b receive the correlation identifier generated by the originating server 111a from the server or module not associated with the plurality of servers of the payment processing system 110 via the network 150.

Figure 5:
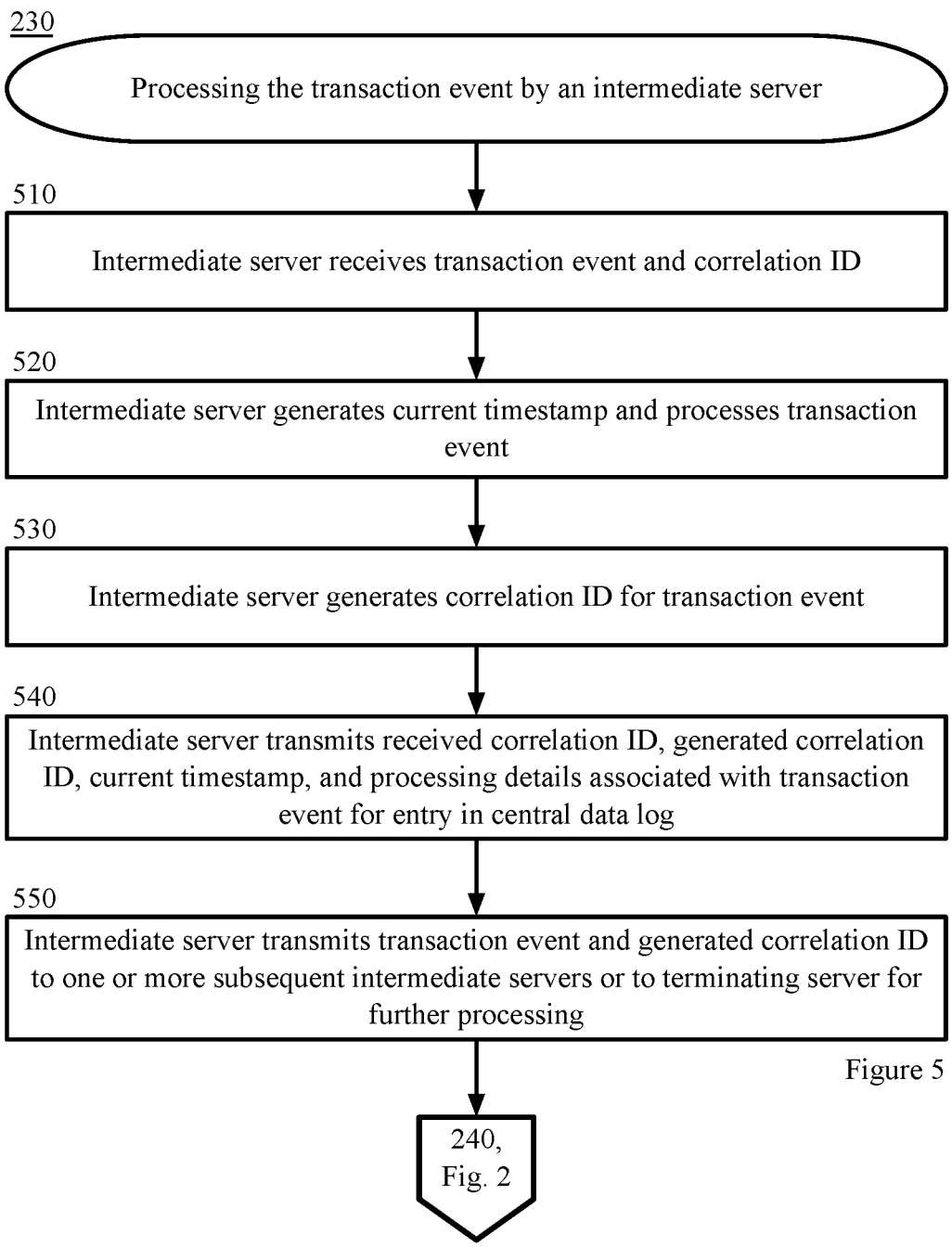
FIG. 5 is a block flow diagram depicting a method for processing a transaction event by an intermediate server, in accordance with certain example embodiments.

FIG. 5 is a block diagram depicting a method 230 for processing a transaction event by an intermediate server 111b, in accordance with certain example embodiments. The method 230 is described with reference to the components illustrated in FIG. 1.

In block 510, the intermediate server 111b receives the transaction event and a correlation identifier. In an example embodiment, the intermediate server 111b receives, from the originating server 111a, data associated with the transaction event and a correlation identifier generated by the originating server 111a. In another example embodiment, the intermediate server 111b receives data associated with the transaction event and a correlation identifier generated by the originating server 111a from a server or module not associated with the plurality of servers associated with the payment processing system 110. For example, the intermediate server 111b receives the data and the correlation identifier generated by the originating server 111a from the issuer system 130 via the network 150.

In certain other example embodiments, the intermediate server 111b receives the transaction event and a correlation identifier from one or more other intermediate servers 111b of the plurality of servers of the payment processing system 110. For example, a second intermediate server 111b receives, from a first intermediate server 111b, data associated with the transaction event and a correlation identifier generated by the first intermediate server 111b. In another example, a third intermediate server 111b receives, from a second intermediate server 111b, data associated with the transaction event and a correlation identifier generated by the second intermediate server 111b.

In certain other example embodiments, the intermediate server 111b receives data associated with the transaction event and a correlation identifier generated by the previous intermediate server 111b from a server or module not associated with the plurality of servers associated with the payment processing system 110. For example, a second intermediate server 111b receives the data and the correlation identifier generated by a first intermediate server 111b from the issuer system 130 or the merchant system 120 via the network 150. In this example, the transaction event is first processed by an originating server 111a, then further processed by the first intermediate server 111b, then further processed by the server or module outside of the plurality of servers of the payment processing system, and then further processed by the second intermediate server 111b.

In block 520, the intermediate server 111b generates a current timestamp and processes the transaction event. In the example embodiments described herein, the one or more intermediate servers 111b generate timestamps in a format similar to timestamps generated by the one or more originating servers 111a and/or the one or more terminating servers 111c. For example, an example current timestamp comprises a time zone and a month, day, year, hour, minute, and second at which the current timestamp was generated. For example, a current timestamp generated by the intermediate server 111b reads "1/21/2015, 15:27:59 Eastern Standard Time." In an example embodiment, the intermediate server 111b generates the current time stamp at the time the intermediate server 111b receives the transaction event. In another example embodiment, the intermediate server 111b generates the current time stamp at a time at which the intermediate server 111b begins processing the transaction event. In yet another example embodiment, the intermediate server 111b generates the current time stamp at a time at which the intermediate server 111b completes the processing of the transaction event. In the example embodiments described herein, the transaction event goes through a series of processing steps or tasks associated with a user-initiated transaction that are performed by a plurality of communicating servers associated with a payment processing system 110. In the example embodiments described herein, the intermediate server 111b processing the transaction event comprises processing an intermediate step of a series of processing steps associated with the user-initiated transaction event.

In block 530, the intermediate server 111b generates a correlation identifier for the transaction event. In an example embodiment, the correlation identifier comprises alphanumeric and/or symbolic characters in a format specific to the intermediate server 111b. In this example embodiment, the correlation identifier format for the intermediate server 111b may be unknown to one or more other servers of the payment processing system 110 that are involved in processing the transaction event. For example, each of the plurality of servers of the payment processing system 110, including one or more originating servers 111a, one or more intermediate servers 111b, and/or one or more terminating servers 111c, may use a different format for generating correlation identifiers for a transaction event. For example, the intermediate server 111b may generate a correlation identifier that associates the transaction event with a merchant system 120 identity. In another example, the generated correlation identifier may correspond to a transaction number, for example, transaction number 110,235. In another example, the generated correlation identifier may correspond to the current timestamp generated by the intermediate server 111b. In yet another example, the generated correlation identifier may correspond to an identity of the user that initiated the transaction event. In yet another example, the correlation identifier is generated based on more than one piece of information associated with the transaction event.

In block 540, the intermediate server 111b transmits the received correlation identifier, the generated correlation identifier, the current timestamp, and processing details associated with the transaction event for entry into the central data log 115. In an example embodiment, the intermediate server 111b transmits the correlation identifier generated by the originating server 111a and received by the intermediate server 111b in addition to the correlation generated by the intermediate server 111b to the central data log 115. In another example embodiment, a subsequent intermediate server 111b transmits a correlation generated by a previous intermediate server 111b and received by the subsequent intermediate serer 111b in addition to the correlation identifier generated by the subsequent intermediate server 111b to the central data log 115. For example, a second intermediate server 111b receives a first correlation identifier generated by a first intermediate server 111b and further processes a transaction event. In this example, the second intermediate server 111b generates a second correlation identifier and transmits the received first correlation identifier and the generated second correlation identifier along with a generated current time stamp and processing details for entry into the central data log 115. In an example embodiment, processing details comprise a summary of one or more processing steps performed by the intermediate server 111b for the transaction event. For example, processing details may comprise "generated payment authorization request." In an example embodiment, the intermediate server 111b further transmits a server identifier identifying the intermediate server 111b to the central data log 115. An example server identifier comprises a physical machine identifier, an IP address, a logical machine identifier, a hostname associated with the server, a service name associated with the server, or another relevant or applicable server identifier.

In an example embodiment, the central data log 115 receives the data transmitted by the intermediate server 111b and stores the data in an entry in the central data log 115 comprising the correlation identifier generated by the intermediate server 111b, the correlation identifier generated by the originating server 111a or previous intermediate server 111b, the current timestamp generated by the intermediate server 111b, and the processing details generated by the intermediate server 111b. In an example embodiment, the central data log 115 stores the received data as an entry in a data table accessible by the central data log 115. An example entry associated with data received from an intermediate server 111b may comprise a string comprising the correlation identifier generated by the intermediate server 111b, the correlation identifier generated by the originating server 111a or previous intermediate server 111b, the current timestamp generated by the intermediate server 111b, and the processing details generated by the intermediate server 111b.

In block 550, the intermediate server 111b transmits the transaction event and generated correlation ID to one or more subsequent intermediate servers 111b or to a terminating server 111c for further processing. In the example embodiments described herein, transmitting the transaction event comprises transmitting data associated with the transaction event to another server of the plurality of servers of the payment processing system 110 for further processing of the transaction event. In an example embodiment, the data associated with the transaction event transmitted by the intermediate server 111b to the one or more other intermediate servers 111b or to the terminating server 111c is different than the data received from the intermediate server 111b prior to the intermediate server 111b processing the transaction event. For example, the intermediate server 111b may have transformed the data, added data, or taken away data during the processing of the transaction event. In another example embodiment, the data associated with the transaction event transmitted by the intermediate server 111b to the one or more other intermediate servers 111b or to the terminating server 111c is the same as the data received by the intermediate server 111b prior to the intermediate server 111b processing the transaction event.

In certain example embodiments, the intermediate server 111b may, in addition to or instead of transmitting the transaction event and the generated correlation identifier to one or more other intermediate servers 111b or to a terminating server 111c of the plurality of servers of the payment processing system 110, transmit the transaction event and the generated correlation identifier to a server or module outside of the plurality of servers associated with the payment processing system 110. For example, the intermediate server 111b transmits data associated with the transaction event to a server of a system not associated with the payment processing system 110 or to a server or module of the payment processing system 110 not associated with the plurality of communicating servers that process transaction events. For example, the intermediate server may transmit the transaction event in the form of a payment authorization request to an issuer system 130 associated with the payment information selected by the user for use in the digital wallet transaction or may transmit the transaction event to an account management system that manages the user's digital wallet account associated with the payment processing system 110. In these example embodiments, in which the intermediate server 111b transmits the transaction event to a server outside of the plurality of servers associated with the payment processing system 110, the server receiving the transaction event from the intermediate server 111b further processes the transaction event and transmits the transaction event to one or more other intermediate servers 111b or to a terminating server 111c of the plurality of servers of the payment processing system 110.

From block 550, the method 230 proceeds to block 240, in FIG. 2.

Returning to FIG. 2, in block 240, the payment processing system 110 determines whether more than one processing step remains.

If more than one processing step remains, the method 200 proceeds to block 230.

In block 230, one or more intermediate servers 111b further process the transaction event and log transaction event data in the central data log 115. For example, a transaction event may require a plurality of intermediate processing steps performed by a plurality of intermediate servers 111b of the payment processing system 110b. In an example embodiment, as the transaction event is processed by each intermediate server 111b, each intermediate server 111b transmits to the central data log 115 a received correlation identifier generated by the previous intermediate server 111b, a correlation identifier generated by the current intermediate server 111b, a current time stamp generated by the current intermediate server 111b, and processing details generated by the current intermediate server 111b. In this example embodiment, after transmitting the data to the central data log 115, the current intermediate server 111b transmits the correlation identifier generated by the current intermediate server 111b along with data associated with the transaction event to a subsequent intermediate server 111b for further processing.

In an example, a first intermediate server 111b receives a transaction event and a first correlation identifier generated by an originating server 111b from the originating server 111a. In this example, the first intermediate server 111b performs a processing step to process the transaction event, generates a second correlation identifier for the transaction event, generates a first current time stamp, and generates first processing details associated with the transaction event. In this example, the first intermediate server 111*b* transmits the first correlation identifier, the second correlation identifier, the first current time stamp, and the first processing details to the central data log 115 for entry into the central data log 115. In this example, the first intermediate server 111*b* transmits data associated with the transaction event and the second correlation identifier to a second intermediate server 111*b* of the payment processing system 110.

Continuing with this example, the second intermediate server 111*b* receives the transaction event and the second correlation identifier generated by the first intermediate server 111*b* from the first intermediate server 111*b*. In this example, the second intermediate server 111*b* performs a processing step to process the transaction event, generates a third correlation identifier for the transaction event, generates a second current time stamp, and generates second processing details associated with the transaction event. In this example, the second intermediate server 111*b* transmits the second correlation identifier, the third correlation identifier, the second current time stamp, and the second processing details to the central data log 115 for entry into the central data log 115. In this example, the second intermediate server 111*b* transmits data associated with the transaction event and the third correlation identifier to a third intermediate server 111*b* of the payment processing system 110.

Continuing with this example, the third intermediate server 111*b* receives the transaction event and the third correlation identifier generated by the second intermediate server 111*b* from the second intermediate server 111*b*. In this example, the third intermediate server 111*b* performs a processing step to process the transaction event, generates a fourth correlation identifier for the transaction event, generates a third current time stamp, and generates third processing details associated with the transaction event. In this example, the third intermediate server 111*b* transmits the third correlation identifier, the fourth correlation identifier, the third current time stamp, and the third processing details to the central data log 115 for entry into the central data log 115.

Continuing with this example, the central data log 115 receives the data transmitted by the first intermediate server 111*b*, the second intermediate server 111*b*, and the third intermediate server 111*b*. In this example, the central data log 115 creates three entries to the central data log 115 corresponding to the data transmissions received from each of the three intermediate servers 111*b*. For example, the first entry comprises the first correlation identifier, the second correlation identifier, the first time stamp, and the first processing details. For example, second entry comprises the second correlation identifier, the third correlation identifier, the second time stamp, and the second processing details. For example, the third entry comprises the third correlation identifier, the fourth correlation identifier, the third time stamp, and the third processing details.

Returning to block 240, if only one processing step remains, the method 200 proceeds to block 250.

In block 250, a terminating server 111*c* processes the transaction event and logs transaction event data in a central data log 115. The method for processing the transaction event by a terminating server 111*c* is described in more detail hereinafter with reference to the method 250 described in FIG. 6.

Figure 6:
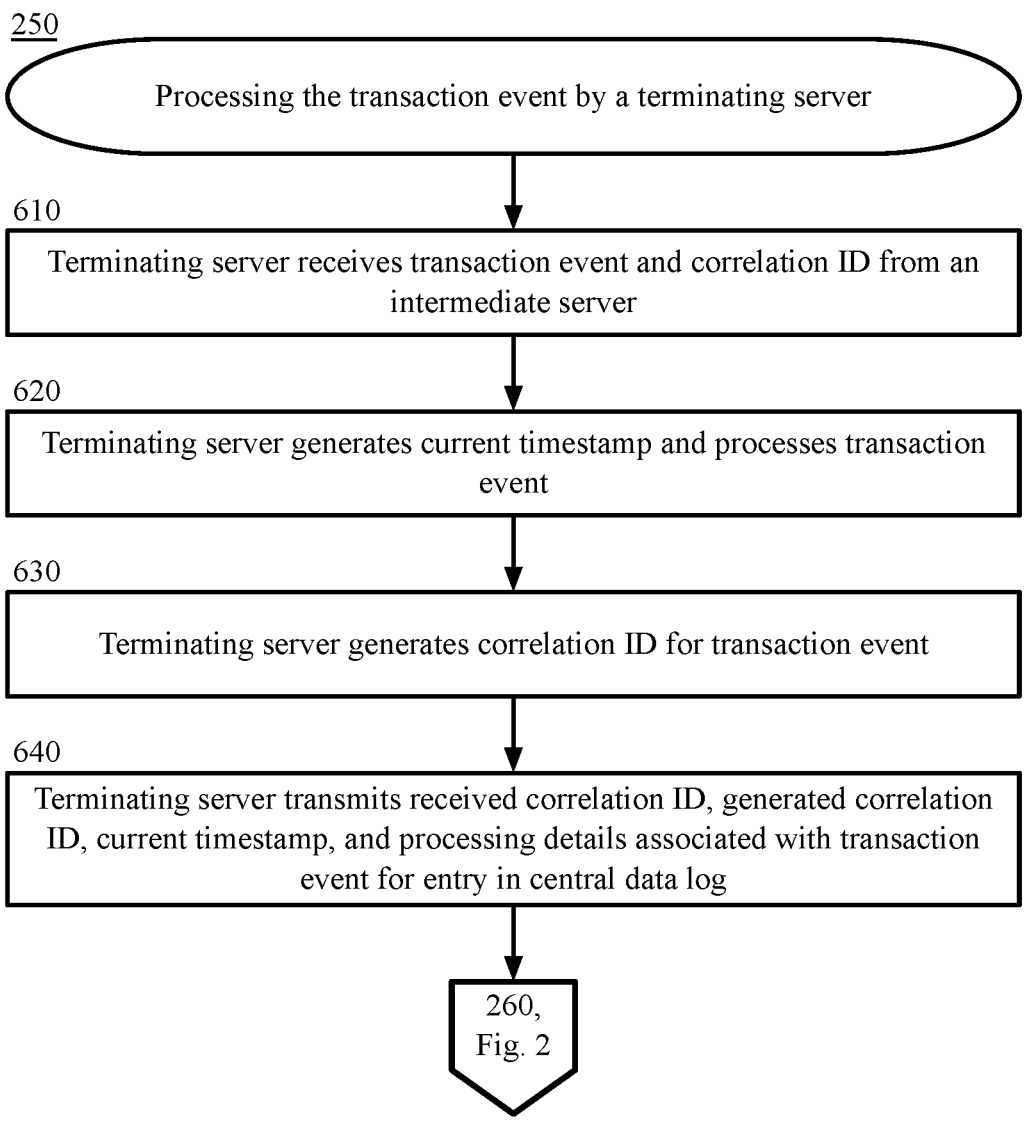
FIG. 6 is a block flow diagram depicting a method for processing a transaction event by a terminating server, in accordance with certain example embodiments.

FIG. 6 is a block diagram depicting a method 250 for processing a transaction event by a terminating server 111*c*, in accordance with certain example embodiments. The method 250 is described with reference to the components illustrated in FIG. 1.

In block 610, the terminating server 111*c* receives the transaction event and a correlation identifier from an intermediate server 111*b*. In an example embodiment, the terminating server 111*c* receives, from the intermediate server 111*b*, data associated with the transaction event and a correlation identifier generated by the intermediate server 111*b*. In another example embodiment, the terminating server 111*c* receives data associated with the transaction event and a correlation identifier generated by the intermediate server 111*b* from a server or module not associated with the plurality of servers associated with the payment processing system 110. For example, the terminating server 111*c* receives the data and the correlation identifier generated by the intermediate server 111*b* from the issuer system 130 via the network 150.

In certain other example embodiments, the terminating server 111*c* receives data associated with the transaction event and a correlation identifier generated by an intermediate server 111*b* from a server or module not associated with the plurality of servers associated with the payment processing system 110. For example, a terminating server 111*c* receives the data and the correlation identifier generated by a first intermediate server 111*b* from the issuer system 130 or the merchant system 120 via the network 150. In this example, the transaction event is first processed by an originating server 111*a*, then further processed by the first intermediate server 111*b*, then further processed by the server or module outside of the plurality of servers of the payment processing system, and then further processed by the terminating server 111*c*.

In block 620, the terminating server 111*c* generates a current timestamp and processes the transaction event. In the example embodiments described herein, the one or more terminating servers 111*c* generate timestamps in a format similar to timestamps generated by the one or more originating servers 111*a* and/or the one or more intermediate servers 111*b*. For example, an example current timestamp comprises a time zone and a month, day, year, hour, minute, and second at which the current timestamp was generated. For example, a current timestamp generated by the terminating server reads "1/21/2015, 16:02:12 Eastern Standard Time." In an example embodiment, the terminating server 111*c* generates the current time stamp at the time the terminating server 111*c* receives the transaction event. In another example embodiment, the terminating server 111*c* generates the current time stamp at a time at which the terminating server 111*c* begins processing the transaction event. In yet another example embodiment, the terminating server 111*c* generates the current time stamp at a time at which the terminating server 111*c* completes the processing of the transaction event. In the example embodiments described herein, the transaction event goes through a series of processing steps or tasks associated with a user-initiated transaction that are performed by a plurality of communicating servers associated with a payment processing system 110. In the example embodiments described herein, the terminating server 111*c* processing the transaction event comprises processing a final step of a series of processing steps associated with the user-initiated transaction event.

In block 630, the terminating server 111*c* generates a correlation identifier for the transaction event. In an example embodiment, the correlation identifier comprises alphanumeric and/or symbolic characters in a format specific to the terminating server 111*c*. In this example embodiment, the correlation identifier format for the terminating server 111c may be unknown to one or more other servers of the payment processing system 110 that are involved in processing the transaction event. For example, each of the plurality of servers of the payment processing system 110, including one or more originating servers 111a, one or more intermediate servers 111b, and/or one or more terminating servers 111c, may use a different format for generating correlation identifiers for a transaction event. For example, the terminating server 111c may generate a correlation identifier that associates the transaction event with a merchant system 120 identity. In another example, the generated correlation identifier may correspond to a transaction number, for example, transaction number 110,235. In another example, the generated correlation identifier may correspond to the current timestamp generated by the terminating server 111c. In yet another example, the generated correlation identifier may correspond to an identity of the user that initiated the transaction event. In yet another example, the correlation identifier is generated based on more than one piece of information associated with the transaction event.

In block 640, the terminating server 111c transmits the received correlation identifier, the generated correlation identifier, the current timestamp, and processing details associated with the transaction event for entry in the central data log 115. In an example embodiment, the terminating server 111c transmits the correlation identifier generated by the intermediate server 111b and received by the terminating server 111c in addition to the correlation identifier generated by the terminating server 111c to the central data log 115. In an example embodiment, processing details comprise a summary of one or more processing steps performed by the terminating server 111c for the transaction event. For example, processing details may comprise "generated payment authorization request." In an example embodiment, the terminating server 111c further transmits a server identifier identifying the terminating server 111c to the central data log 115. An example server identifier comprises a physical machine identifier, an IP address, a logical machine identifier, a hostname associated with the server, a service name associated with the server, or another relevant or applicable server identifier.

In an example embodiment, the central data log 115 receives the data transmitted by the terminating server 111c and stores the data in an entry in the central data log 115 comprising the correlation identifier generated by the terminating server 111c, the correlation identifier generated by the previous intermediate server 111b, the current timestamp generated by the terminating server 111c, and the processing details generated by the terminating server 111c. In an example embodiment, the central data log 115 stores the received data as an entry in a data table accessible by the central data log 115. An example entry associated with data received from a terminating server 111c may comprise a string comprising the correlation identifier generated by the terminating server 111c, the correlation identifier generated by the previous intermediate server 111b, the current timestamp generated by the terminating server 111c, and the processing details generated by the terminating server 111c.

In the example embodiments described herein, the terminating server 111c, after processing the transaction event, does not transmit the transaction event to any other server of the plurality of servers of the payment processing system 110 for further processing. In an example embodiment, the terminating server 111c completes the processing of the transaction event. In another example embodiment, an intermediate server 111b processes the transaction event but is unable to transmit the transaction event to another intermediate server 111b or to a terminating server 111c for further processing. In this example embodiment, the intermediate server 111b is considered a terminating server 111c. In certain example embodiments, a terminating server 111c, after completing the final processing of a transaction event, transmits data associated with the transaction event to a server outside of the payment processing system 110. For example, the terminating server 111c may transmit a receipt of the transaction to the user computing device 140 and/or the merchant system 120.

In the example embodiments described herein, after a transaction event undergoes final processing at a terminating server 111c or at an intermediate server 111b acting as a terminating server 111c, the central data log 115 has received data from each server that has processed the transaction event and stored entries in the central data log 115 associated with each server. For example, the central data log 115 stores an entry associated with each of an originating server 111a, a first intermediate server 111b, a second intermediate server 111c, and a terminating server 111c. In an example embodiment, the central data log 115 stores entries as it receives transmissions from servers associated with the payment processing system 110. In this example embodiment, the central data log 115 may simultaneously or concurrently receive data transmissions associated with a plurality of transaction events being processed by the plurality of servers of the payment processing system 110 during a certain period of time. In an example embodiment, the central data log 115 stores each entry as a row in a table, a line in a text file, or in another useful or relevant way. In an example embodiment, each entry comprises one or more correlation identifiers, a current time stamp generated by the server from which the data associated with the entry was received, and processing details generated by the server from which the data associated with the entry was received. In this example embodiment, the one or more correlation identifiers in each entry comprise a correlation identifier generated by the server from which the data associated with the entry was received by the central data log 115. In this example embodiment, the one or more correlation identifiers in each entry may further comprise one or more correlation identifiers received by the server from which the data associated with the entry was received by the central data log 115 from one or more servers of the payment processing system 110 that previously processed the transaction event.

From block 640, the method 250 proceeds to block 260 in FIG. 2.

Returning to FIG. 2, in block 260, an agent of the payment processing system 110 submits a query associated with the transaction event. In an example embodiment, an agent associated with the payment processing system 110 desires to know the status of a transaction event and transmits a query to the payment processing system 110 requesting a transaction event history. In an example embodiment, the query comprises a correlation identifier generated by one of the plurality of servers of the payment processing system 110 for the transaction event. In an example embodiment, the query comprises a merchant ID, a user ID, a payment request ID, or other relevant correlation identifier generated by a server of the payment processing system 110 involved in processing the transaction event. In another example embodiment, the query comprises data that can be correlated with information in an entry associated with the transaction event in the central data log 115. For example, the query may comprise an abbreviated user account number than can be correlated to a payment request ID in an entry saved in the central data log 115.

In another example embodiment, one or more of the servers of the payment processing system 110 automatically and periodically generates a query of a transaction event to determine the status of a transaction event. In yet another example embodiment, an agent or server not associated with the payment processing system 110 generates a query of a transaction event and communicates the query to the payment processing system 110. For example, an agent or server associated with a payment validation system generates a query of a transaction event to determine the status of a transaction event.

In block 270, the payment processing system 110 retrieves data associated with the transaction event from the central data log 115. The method for retrieving entries associated with the transaction event from the central data log 115 is described in more detail hereinafter with reference to the method 270 described in FIG. 7.

Figure 7:
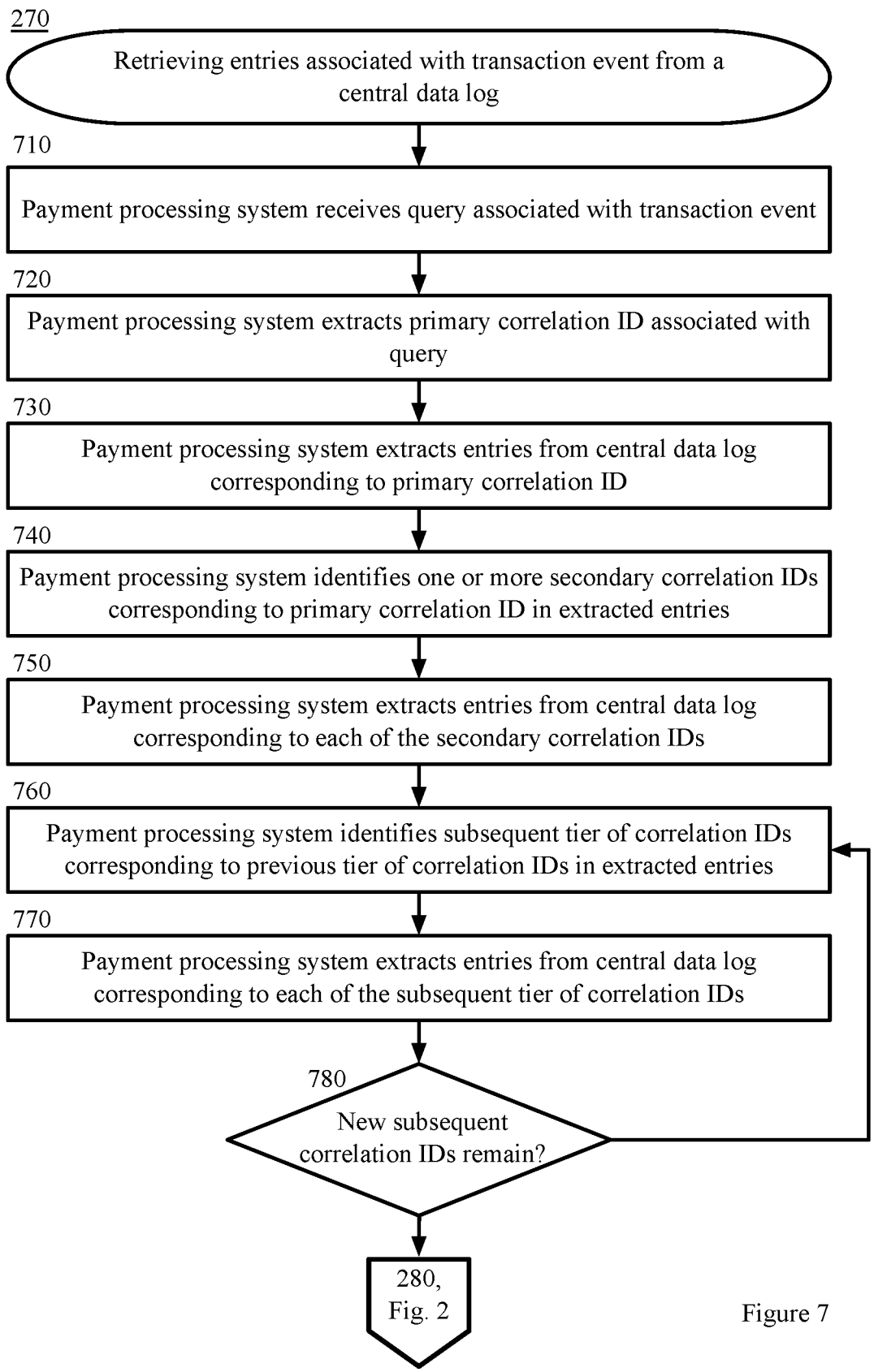
FIG. 7 is a block flow diagram depicting a method for retrieving entries associated with the transaction event from a central data log, in accordance with certain example embodiments

FIG. 7 is a block diagram depicting a method 270 for retrieving entries associated with a transaction event from a central data log 115, in accordance with certain example embodiments. The method 270 is described with reference to the components illustrated in FIG. 1.

In the example embodiments described herein, the central data log 115 stores entries associated with data received from each of a plurality of processors of the payment processing system 110. In an example embodiment, the central data log 115 receives data from each processor at a time after the particular processor performs a processing step for a transaction event. In an example embodiment, data received by the central data log 115 from an originating server 111a comprises a correlation identifier generated by originating server 111a, a current time stamp generated by the originating server 111a, and processing details generated by the originating server 111a. In an example embodiment, data received by the central data log 115 from an intermediate server 111b comprises a correlation identifier received by the intermediate server 111b from an originating server 111a or another intermediate server 111b that processed the transaction event immediately prior to the intermediate server 111b, a correlation identifier generated by the intermediate server 111b, a current time stamp generated by the intermediate server 111b, and processing details generated by the intermediate server 111b. In an example embodiment, data received by the central data log 115 from a terminating server 111c comprises a correlation identifier received by the terminating server 111c from an originating server 111a or an intermediate server 111b that processed the transaction event immediately prior to the terminating server 111c, a correlation identifier generated by the terminating server 111c, a current time stamp generated by the terminating server 111c, and processing details generated by the terminating server 111c.

In block 710, the payment processing system 110 receives a query associated with a transaction event. In an example embodiment, an agent associated with the payment processing system 110 desires to know the status of a transaction event and transmits a query to the payment processing system 110 requesting a transaction event history. In another example embodiment, a server associated with the payment processing system 110 generates a query. In yet another example embodiment, the payment processing system 110 receives a query from an agent or server not associated with the payment processing system 110. In an example embodiment, the query comprises a correlation identifier generated by one of the plurality of servers of the payment processing system 110 for the transaction event. In an example embodiment, the query comprises a merchant ID, a user ID, a payment request ID, or other relevant correlation identifier generated by a server of the payment processing system 110. In another example embodiment, the query comprises data that can be correlated with information in an entry associated with the transaction event in the central data log 115. For example, the query may comprise an abbreviated user account number than can be correlated to a payment request ID in an entry saved in the central data log 115.

In block 720, the payment processing system 110 extracts a primary correlation identifier associated with the query. In another example embodiment, the payment processing system 110 determines a primary correlation identifier based on the query. For example, the payment processing system 110 extracts an entry from the central data log 115 comprising data that matches data received in the query. In this example, the payment processing system 110 identifies a primary correlation identifier from the extracted entry.

In block 730, the payment processing system 110 extracts one or more entries from the central data log 115 corresponding to the primary correlation identifier. In an example embodiment, the central data log 115 comprises a table or a text file comprising entries associated with transaction events processed by a plurality of servers of the payment processing system 110. In an example embodiment, the central data log 115 comprises a tracing repository for storing entries associated with transaction events processed by the plurality of servers of the payment processing system 110. In an example, each row of the table or each line of the text file comprises a separate entry in the central data log 115. In an example, to extract entries in the central data log 115 associated with the primary correlation identifier, the payment processing system 110 extracts all rows from a table comprising the primary correlation identifier or extracts all lines in a text file.

In block 740, the payment processing system 110 identifies one or more secondary correlation identifiers corresponding to the primary correlation identifier in the extracted entries. In an example embodiment, each time an originating server 111a of the plurality of servers processes a transaction event, the originating server 111a transmits data to the central data log 115 comprising a correlation identifier generated by the originating server 111a. In this example embodiment, the central data log 115 creates an entry comprising the correlation identifier generated by the originating server 111a. In this example embodiment, each time an intermediate 111b server or terminating server 111c processes a transaction event, the intermediate server 111b or terminating server 111c transmits data to the central data log 115 comprising a correlation identifier generated by the intermediate server 111b or terminating server 111c in addition to one or more correlation identifiers received by the intermediate server 111b or terminating server 111c and generated by a server that processed the transaction event previous to transmitting the transaction event to the intermediate server 111b or terminating server 111c. In this example embodiment, the central data log 115 creates an entry comprising the correlation identifier generated by the intermediate server 111b or terminating server 111c from which the data was received in addition to one or more correlation identifiers from servers that processed the transaction event before transmitting the transaction event to the intermediate server 111b or the terminating server 111c.

Therefore, in the example embodiments described herein, entries stored in the central data log 115 based on data received from originating servers 111a may comprise one correlation identifier and entries stored in the central data log 115 based on data received from intermediate servers 111b or terminating servers 111c may comprise two or more correlation identifiers. In an example embodiment, the payment processing system 110 identifies secondary correlation identifiers one or more extracted entries corresponding to data received from one or more intermediate servers 111b or terminating servers 111c. For example, the primary correlation identifier is "bob," a first extracted entry comprises "bob, james, 1/25/2014 15:35:40 ET, user payment information extracted," a second extracted entry comprises "bob, randall, 1/25/2014 15:34:20 ET, payment authorization request drafted and forwarded," and a third extracted entry comprises "bob, 1/25/2014 15:30:12 ET, user payment request received and forwarded." In this example, the payment processing system 110 identifies "james" and "randall" are secondary correlation identifiers from the first and second extracted entries but does not identify any secondary correlation identifiers from the third extracted entry.

In block 750, the payment processing system 110 extracts one or more entries from the central data log 115 corresponding to each of the secondary correlation identifiers. Continuing with the previous example, the payment processing system 110 extracts all entries in the central data log comprising the correlation identifiers "james" or "randall." In this example, the only extracted entry based on one or more of the secondary correlation identifiers "james" and/or "randall" comprises "randall, james, thomas, 1/25/2014 15:36:10, payment authorization request and payment information transmitted."

In block 760, the payment processing system 110 identifies a subsequent tier of correlation identifiers corresponding to the previous tier of correlation identifiers in the extracted entries. Continuing with the previous example, the payment processing system 110 identifies "thomas" as a tertiary correlation identifier from the entry comprising "randall, james, thomas, 1/25/2014 15:36:10, payment authorization request and payment information transmitted," based on the secondary correlation identifiers "james" and "randall." In another example embodiment, the payment processing system 110 does not identify a subsequent tier of correlation identifiers corresponding to the previous tier of correlation identifiers in the extracted entries. For example, the payment processing system 110 does not identify any tertiary correlation identifiers from entries extracted based on secondary correlation identifiers or does not identify any quaternary correlation identifiers from entries extracted based on tertiary correlation identifiers.

In block 770, the payment processing system 110 extracts entries from the central data log 115 corresponding to each of the subsequent tier of correlation identifiers. In another example embodiment, there are no new entries in the central data log 115 corresponding to each of the subsequent tier of correlation identifiers, therefore the payment processing system 110 does not extract any more entries from the central data log 115.

In block 780, the payment processing system 110 determines whether any new subsequent correlation identifiers remain in the extracted entries.

If new subsequent correlation identifiers remain in the extracted entries, the method 270 proceeds to block 760.

Returning to block 780, if no new subsequent correlation identifiers remain in the extracted entries, the method 270 proceeds to block 280 in FIG. 2. For example, the payment processing system 110 does not identify any tertiary correlation identifiers from entries extracted based on secondary correlation identifiers or does not identify any quaternary correlation identifiers from entries extracted based on tertiary correlation identifiers.

Returning to FIG. 2, in block 280, the payment processing system 110 orders the extracted entries from the central data log 115 associated with the transaction event according to timestamp and outputs a transaction event history. In an example embodiment, the agent associated with the payment processing system 110 is able to determine the status of the transaction event based on the transaction event history. An example transaction event history comprises a list of the extracted entries from the central data log 115 associated with the transaction event by order of timestamp. In an example embodiment, the payment processing system 110 outputs the transaction history. For example, the payment processing system 110 transmits the transaction event history to a computing device accessible to the agent via email or text message or prints the transaction event history on a printer accessible to the agent.

Continuing with the previous example, the extracted entries comprise a first extracted entry comprising "bob, james, 1/25/2014 15:35:40 ET, user payment information extracted," a second extracted entry comprising "bob, randall, 1/25/2014 15:35:20 ET, payment authorization request drafted and forwarded," a third extracted entry comprising "bob, 1/25/2014 15:30:12 ET, user payment request received and forwarded," and a fourth extracted entry comprising "randall, james, thomas, 1/25/2014 15:36:10, payment authorization request and payment information transmitted." In this example, organizing the extracted entries by time stamp, the payment processing system 110 creates a transaction history comprising:

bob, 1/25/2014 15:30:12 ET, user payment request received and forwarded bob, randall, 1/25/2014 15:35:20 ET, payment authorization request drafted and forwarded bob, james, 1/25/2014 15:35:40 ET, user payment information extracted randall, james, thomas, 1/25/2014 15:36:10, payment authorization request and payment information transmitted In an example embodiment, the payment processing system 110 generates the transaction event history in a tabular format, each row of the table comprising an entry. In another example embodiment, the payment processing system 110 generates a transaction event history as a text file, each row of text comprising an entry. In an example embodiment, additionally information may be displayed or included in the transaction event history. For example, the payment processing system 110 may include a server identifier for each entry in the transaction event history identifying the server from which the data in each entry was received. An example server identifier comprises a physical machine identifier, an IP address, a logical machine identifier, a hostname associated with the server, a service name associated with the server, or another relevant or applicable server identifier.

In an example embodiment:

User makes a purchase via Application

Application server logs:

Application: Authorizing a purchase

Time, server machine ids

User ID of purchaser

Amount $1.23

Application transaction XYZ

Application server sends a request to the Billing server

Billing server logs:

Billing: Authorizing a purchase

Time, server machine ids (every process logs this automatically by using the tracing API)
Amount $1.23
Application transaction XYZ
Billing transaction ABC
Billing server determines what instrument to use to pay for the purchase
Billing server logs:
Billing: Finding instrument
Billing transaction ABC
Instrument ID 12345
Billing server sends request to vendor interface, telling it to send the payment to the appropriate vendor for that instrument
Billing server logs:
Billing: Sending request to vendor
Amount $1.23
Vendor SomeVendor
Billing transaction ABC
Vendor key PQR
Vendor interface sends a request to the vendor
Vendor interface logs:
Interface: Sending request to vendor
Amount $1.23
Vendor SomeVendor
Vendor key PQR
Vendor interface receives response
Vendor interface logs:
Interface: Receiving response from vendor
Vendor SomeVendor
Vendor key PQR
Status code (APPROVED, DECLINED, ERROR . . . )
Latency (the difference in timestamps between the request and the response, added here for convenience in querying)
Vendor interface sends response back to billing server
Billing server logs:
Billing: Receiving response from vendor
Billing transaction ABC (it doesn't have to log the vendor key, as this event can already be tied to the billing transaction from the log of the outgoing event, above)
Status
Latency
Billing server sends response back to Application server
Application server logs:
Application: Receiving response for authorization
Application transaction XYZ (again, it doesn't have to log the Billing transaction here)
Status
Latency
Time passes
Assuming the purchase was authorized, the batch processor looks for authorized purchases to send for capture
The batch processor starts assembling a batch to send to the vendor. It logs:
Batcher: Starting batch
Batch id 4567
Vendor SomeVendor
For each record added to the batch, typically thousands or tens of thousands, the batch processor logs:
Batcher: Adding capture request record
Batch id 4567
Vendor key PQR (or whatever it is for that particular record)
Amount $1.23 (or whatever it is for that particular record)
When the batch is prepared, the batch processor creates a batch file, and logs:
Batcher: Creating file
File ASDF.SomeVendorCaptureRequests
Batch id 4567
The file handler sends the file to the vendor for processing. It logs:
File Handler: Sending file
File ASDF.SomeVendorCaptureRequests
More time passes. The vendor processes the batches, using whatever server it uses. It sends back files containing batches of responses. The files may or may not match up with the batches sent out (e.g., if a big batch, it may send back several smaller response files, or it may combine responses for multiple batches sent). Eventually, one of the files the vendor sends back contains a capture response for our payment. Suppose this is file QWERTY.SomeVendorCaptureResponses. Then the file handler will have logged (along with its other traffic):
File Handler: Receiving file
File QWERTY.SomeVendorCaptureResponses
and the batch processor will have logged, for that file:
Batcher: Decoding a file
File QWERTY.SomeVendorCaptureResponses
for each record in that file, it would log:
Batcher: Processing capture response record
Vendor key PQR (or whatever the vendor key is for that record)

In this example, all of the above mentioned logged records are stored in a database for handling logging records. In another example, all of these logged records go into a relational database or some other database. Because the database can be queried in much the same way as a relational database, the system can use a general-purpose query facility to ask any number of interesting queries. For example, a query may comprise a request for how long it took to process the authorization request for application transaction XYZ at each level of the stack (Application, Billing and Vendor in this case). Because the system is able to link correlation identifiers together, it can answer this question for billing transaction ABC or for vendor key PQR. It does not matter which of these identifiers the system starts with because the system can use any of them to retrieve information concerning any or all of them. In another example, a query comprises a request for information associated with transactions handled by vendor "SomeVendor" during a certain time period. The system can, using a series of standard database join operations, connect the vendor keys for the transactions handled by that vendor in the given time period to the billing transactions, and thence to the application transactions. In another example, a query may comprise a request for a batch identifier associated with a batch that was the capture response for application transaction XYZ. In this example, the system may connect correlation identifier "application transaction XYZ" to correlation identifier "billing transaction ABC" to correlation identifier "vendor key PQR" to correlation identifier "batch id 4567." In another example, the query comprises a request for a time at which the capture request for application transaction XYZ was sent to the vendor. In this example, the system can connect batch id 4567 to file ASDF.SomeVendorCaptureRequests, and from that find the time the file was sent. In an example embodiment, besides linking correlation identifiers together, the system can use them as tags to get finer granularity on routine queries. For example, the system may use one or more correlation identifiers to determine what portion of transactions processed by vendor SomeVendor are declined, what the 90th percentile latency for authorization requests handled by SomeVendor, if the distribution of latencies look different for operations besides authorization, and if the distribution of latencies looks different for vendors other than Somevendor.

In this example embodiment, while the application server communicates directly with the billing server, and the billing server communicates directly with the vendor interface and the instrument service, none of these components communicates directly with the batch processor or file handler. For example, the batch processor and file handler may not communicate directly with each other, and the application server may not communicate directly with the vendor interface. Thus, the system may associate correlation identifiers together for an event processed by processors or servers that do not communicate directly with each other.

OTHER EXAMPLE EMBODIMENTS

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to secure a wireless mesh network of beacon devices, comprising, comprising:
    a storage device; and
    a processor communicatively coupled to the storage device, wherein the processor executes application code instructions that are stored in the storage device to cause the system to:
        receive, from a first processor in response to processing an event by the first processor, first data associated with the event, the first data comprising a first correlation identifier associated with the event and the first processor;
        store the first data as a first entry in a central data log of a tracing repository;
        receive, from a second processor, in response to processing the event by the second processor at a first time after processing the event by the first processor, second data associated with the event, the second data comprising a second correlation identifier associated with the event and the second processor and further comprising at least one primary data element in common with the first data;
        store the second data as a second entry in the central data log of the tracing repository, the stored second data being associated with the stored first data based on the at least one primary data element of the second data in common with the first data;
        receive a query;
        generate, based on the query, an event status comprising the first entry and the second entry from the central data log; and
        output the generated event status.

2. The system of claim 1, wherein the processor is further configured to execute computer-readable program instructions stored in the storage medium to cause the system to:
    receive, from a third processor in response to processing the event by the third processor at a second time after processing the event by the first processor and after processing the event by the second processor, third data associated with the event, the third data comprising a third correlation identifier associated with the event and the third processor and further comprising at least one secondary data element in common with the second data without having any data elements in common with the first data; and
    store the third data as a third entry in the central data log of the tracing repository, the stored third data being associated with the stored second data based on the at least one secondary data element of the third data in common with the second data, and the stored third data being thereby associated with the stored first data based on the association of the second data with the first data and based on the association of the third data with the second data.

3. The system of claim 2, wherein the query comprises the second correlation identifier and wherein the processor is further configured to execute computer-readable program instructions stored in the storage medium to cause the system to:
    identify, from the central data log, the second entry and the third entry based on the second correlation identifier, the second data, and the third data; and
    identify, from the central data log, the first entry based on the first data and the second data.

4. The system of claim 2, wherein the query comprises the third correlation identifier and wherein the processor is further configured to execute computer-readable program instructions stored in the storage medium to cause the system to:
    identify, from the central data log, the third entry based on the third correlation identifier, the second data, and the third data
    identify, from the central data log, the second entry based on the second data and the third data; and
    identify, from the central data log, the first entry based on the first data and the second data.

5. The system of claim 2, wherein a single computing device comprises the first processor and the second processor.

6. The system of claim 1, wherein the query comprises the first correlation identifier and wherein the processor is further configured to execute computer-readable program instructions stored in the storage medium to cause the system to:
    identify, from the central data log, the first entry and the second entry based on the first correlation identifier, the first data, and the second data.

7. A computer-implemented method to determine status information for events processed by multiple processors, comprising:
    by a computing device:
        receiving, from a first processor in response to processing an event by the first processor, first data associated with the event, the first data comprising a first correlation identifier associated with the event and the first processor;
        storing the first data as a first entry in a central data log of a tracing repository;
        receiving, from a second processor, in response to processing the event by the second processor at a first time after processing the event by the first processor, second data associated with the event, the second data comprising a second correlation identifier associated with the event and the second processor and further comprising at least one primary data element in common with the first data;
        storing the second data as a second entry in the central data log of the tracing repository, the stored second data being associated with the stored first data based on the at least one primary data element of the second data in common with the first data;
        receiving a query;
        generating, based on the query, an event status comprising the first entry and the second entry from the central data log; and
        outputting the generated event status.

8. The method of claim 7, further comprising, by the computing device:
    receiving, from a third processor in response to processing the event by the third processor at a second time after processing the event by the first processor and after processing the event by the second processor, third data associated with the event, the third data comprising a third correlation identifier associated with the event and the third processor and further comprising at least one secondary data element in common with the second data without having any data elements in common with the first data; and
    storing, by the computing device, the third data as a third entry in the central data log of the tracing repository, the stored third data being associated with the stored second data based on the at least one secondary data element of the third data in common with the second data, and the stored third data being thereby associated with the stored first data based on the association of the second data with the first data and based on the association of the third data with the second data.

9. The method of claim 8, wherein the query comprises the second correlation identifier and further comprising, by the computing device:
identifying, from the central data log, the second entry and the third entry based on the second correlation identifier, the second data, and the third data; and
identifying, from the central data log, the first entry based on the first data and the second data.

10. The method of claim 8, wherein the query comprises the third correlation identifier and further comprising, by the computing device:
identifying, from the central data log; the third entry based on the third correlation identifier, the second data, and the third data;
identifying, from the central data log, the second entry based on the second data and the third data; and
identifying, from the central data log, the first entry based on the first data and the second data.

11. The method of claim 7, wherein the query comprises the first correlation identifier and further comprising, by the computing device, identifying, from the central data log, the first entry and the second entry based on the first correlation identifier, the first data, and the second data.

12. The method of claim 7, wherein a single computing device comprises the first processor and the second processor.

13. The method of claim 7, wherein the first processor and the second processor execute in distinct computing devices.

14. A computer program product to determine status information for events processed by multiple processors, comprising:
a non-transitory computer-readable medium having computer-readable program instructions embodied thereon that when executed by a computer cause the computer to:
receive from a first processor in response to processing an event by the first processor, first data associated with the event, the first data comprising a first correlation identifier associated with the event and the first processor;
store the first data as a first entry in a central data log of a tracing repository;
receive, from a second processor, in response to processing the event by the second processor at a first time after processing the event by the first processor, second data associated with the event, the second data comprising a second correlation identifier associated with the event and the second processor and further comprising at least one primary data element in common with the first data;
store the second data as a second entry in the central data log of the tracing repository, the stored second data being associated with the stored first data based on the at least one primary data element of the second data in common with the first data;
receive a query;
generate, based on the query, an event status comprising the first entry and the second entry from the central data log; and
output the generated event status.

15. The computer program product of claim 14, the non-transitory computer readable storage medium further having computer-readable program instructions embodied thereon that when executed by the computer cause the computer to:
receive, from a third processor in response to processing the event by the third processor at a second time after processing the event by the first processor and after processing the event by the second processor, third data associated with the event, the third data comprising a third correlation identifier associated with the event and the third processor and further comprising at least one secondary data element in common with the second data without having any data elements in common with the first data; and
store the third data associated with the event as a third entry in the central data log of the tracing repository, the stored third data being associated with the stored second data based on the at least one secondary data element of the third data in common with the second data, and the stored third data being thereby associated with the stored first data based on the association of the second data with the first data and based on the association of the third data with the second data.

16. The computer program product of claim 15, wherein the query comprises the second correlation identifier, the non-transitory computer readable storage medium further having computer-readable program instructions embodied thereon that when executed by the computer cause the computer to:
identify, from the central data log, the second entry and the third entry based on the second correlation identifier, the second data, and the third data; and
identify, from the central data log, the first entry based on the first data and the second data.

17. The computer program product of claim 15, wherein the query comprises the third correlation identifier, the non-transitory computer readable storage medium further having computer-readable program instructions embodied thereon that when executed by the computer cause the computer to:
identify the third entry based on the third correlation identifier, the second data, and the third data;
identify, from the central data log, the second entry based on the second data and the third data; and
identify, from the central data log, the first entry based on the first data and the second data.

18. The computer program product of claim 14, wherein the query comprises the first correlation identifier, the non-transitory computer readable storage medium further having computer-readable program instructions embodied thereon that when executed by the computer cause the computer to identify, from the central data log, the first entry and the second entry based on the first correlation identifier, the first data, and the second data.

19. The computer program product of claim 14, wherein a single computing device comprises the first processor and the second processor.

20. The computer program product of claim 14, wherein the first processor and the second processor execute in distinct computing devices.

* * * * *